United States Patent [19]

O'Reilly

[11] Patent Number: 5,780,795
[45] Date of Patent: Jul. 14, 1998

[54] CONTACTLESS SWITCHING AND ENCODING

[75] Inventor: Michael O'Reilly, Holliston, Mass.

[73] Assignee: Cole Hersee Company, South Boston, Mass.

[21] Appl. No.: 803,542

[22] Filed: Feb. 20, 1997

[51] Int. Cl.⁶ .......................... B60K 35/00; H01H 9/00
[52] U.S. Cl. ............................................. 200/61.54
[58] Field of Search .......................... 200/61.27, 61.54;
250/229, 221, 551; 307/10.1; 313/54; 341/31;
361/622, 828; 385/50, 53, 114, 125, 126

[56] References Cited

U.S. PATENT DOCUMENTS

| | | | |
|---|---|---|---|
| 4,023,887 | 5/1977 | Speers | 350/96 C |
| 4,131,772 | 12/1978 | Weckenmann et al. | 200/61.54 |
| 4,672,214 | 6/1987 | Takahashi et al. | 250/551 |
| 4,871,909 | 10/1989 | Kokubu | 250/229 |
| 5,101,677 | 4/1992 | Hammerschmitt | 74/335 |
| 5,117,102 | 5/1992 | Mitchell | 250/229 |

*Primary Examiner*—Michael L. Gellner
*Attorney, Agent, or Firm*—Fish & Richardson P.C.

[57] ABSTRACT

Apparatus for use with a vehicle includes an optical switch configured to furnish an electrical output. A mechanical control has a selectable position for controlling a function of the vehicle. The mechanical control has a shutter constructed and arranged to control the electrical output of the optical switch based on the position of the control.

7 Claims, 27 Drawing Sheets

Windshield Wipers = Off

Windshield Wiper
15 Sec. Delay

Windshield Wiper = 10 Sec. Delay

Windshield Wipers = 5 Sec. Delay

Windshield Wiper = 2 Sec. Delay

Windshield Wipers = Low Speed

Windshield Wipers = High Speed

Windshield Wiper = Wash

Lights = Off

Lights = Park

Lights = Park, Low Beam & Fog

Lights = Park & Low Beam

Turn Signal = Right Turn

Turn Signal = Off

Turn Signal = Left Turn

Hazards = On

Hazards = Off

Highbeams = Off

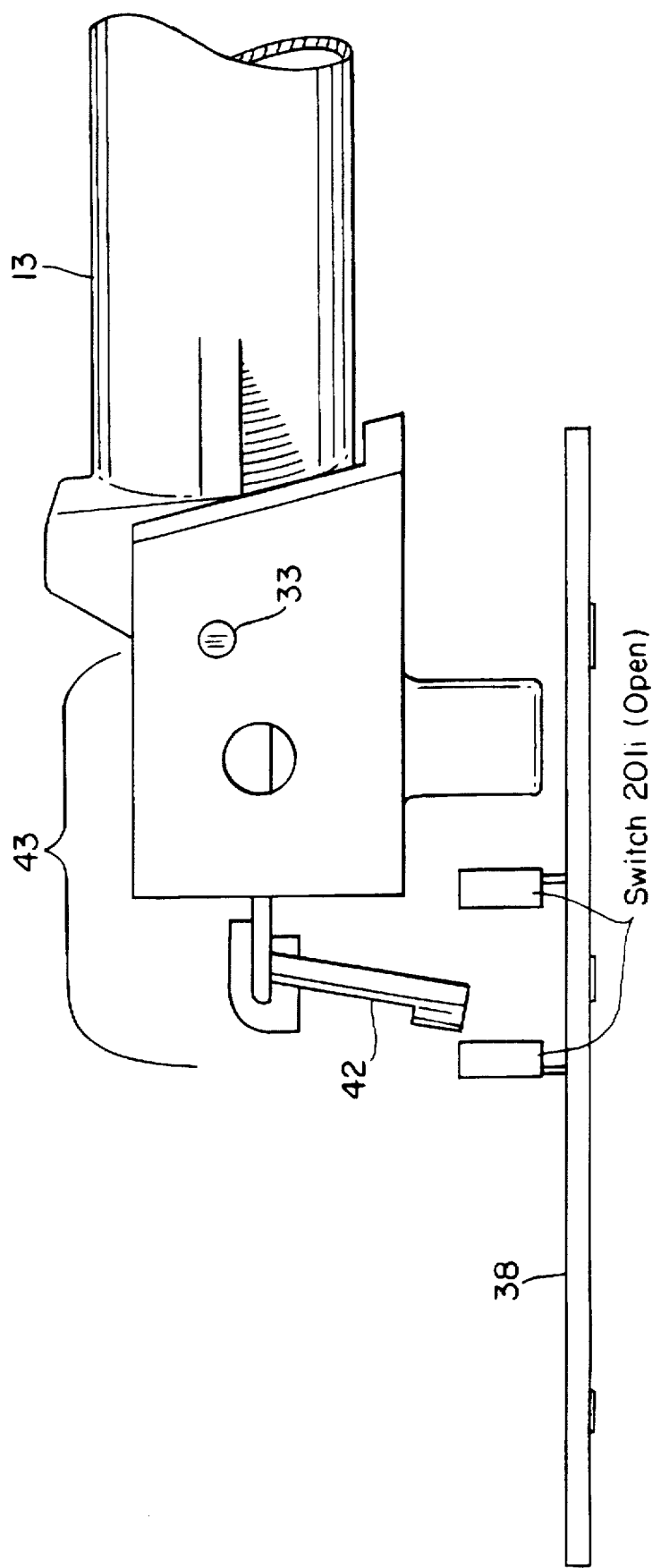

```
"O" = Open                  201a  201b
"X" = Blocked                  \  |  201c
WIPER FUNCTIONS              \ |  /
    OFF              0  0  0
    15 SEC           0  0  X
    10 SEC.          0  X  X
    5 SEC.           0  X  0
    2 SEC.           X  X  0
    LOW              X  0  0
    HIGH             X  0  X
    WASH             X  X  X
```

```
"O" = Open
"X" = Blocked                 201d  201e
LIGHTS                          \   \

OFF                        0  0
    PARK                       X  0
    PARK & LOW BEAM            X  X
    PARK, LOW BEAM & FOG       0  X
```

```
"O" = Open                   201f
"X" = Blocked               /  201g
TURN SIGNAL                /  /

RIGHT      0  X
    OFF        X  X
    LEFT       X  0
```

```
"O" = Open
"X" = Blocked              201h
HAZARD                      /

OFF    0
    ON     X
```

```
"O" = Open
"X" = Blocked
HIGH BEAM      201i

OFF    X
    ON     0
```

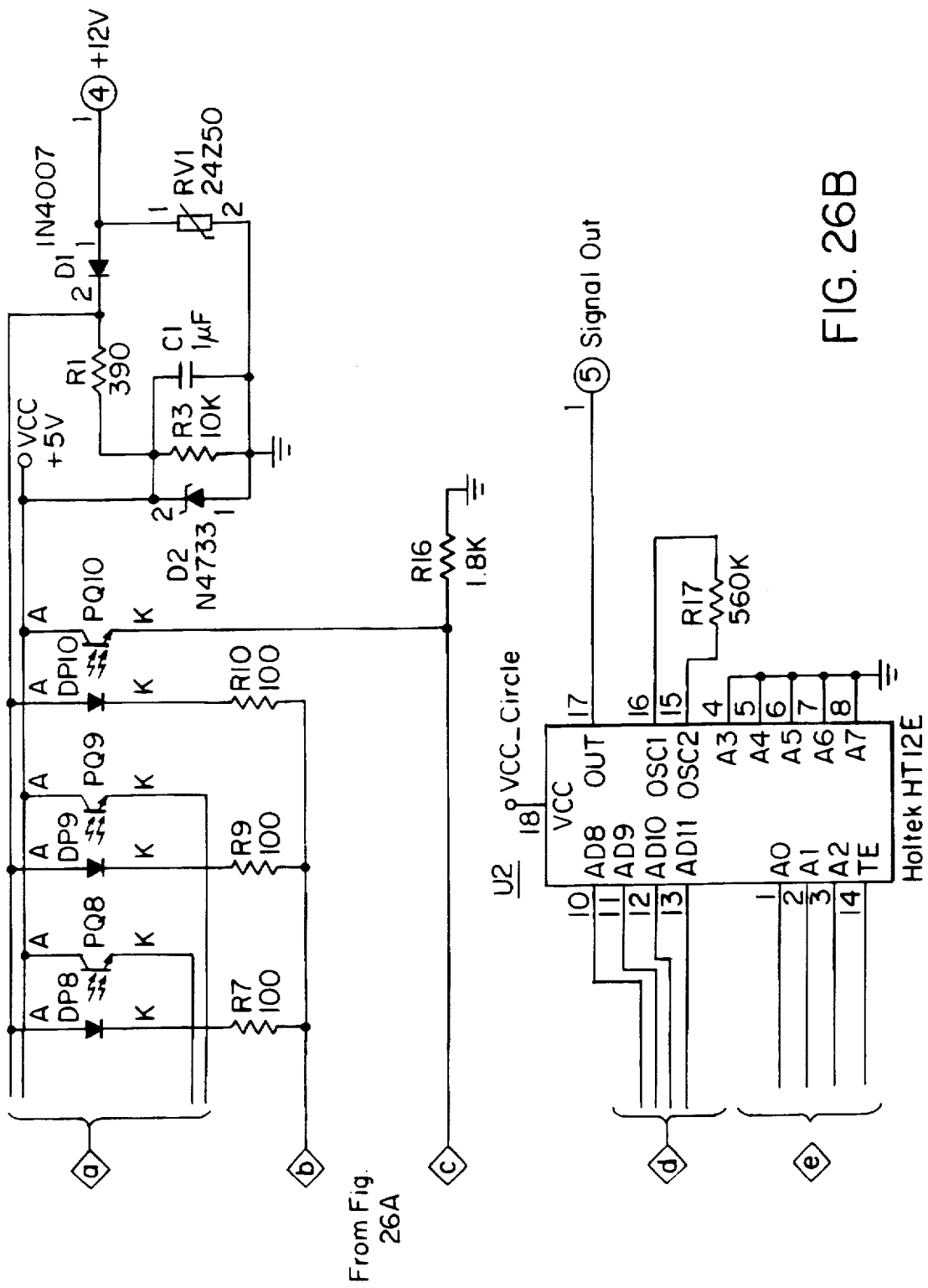

1

CONTACTLESS SWITCHING AND ENCODING

BACKGROUND OF THE INVENTION

The invention relates to contactless switching and encoding.

A steering column of a vehicle typically has one or more controls for controlling functions (e.g., a headlight) of the vehicle. For example, a lever might be pivotally attached to a steering column and used to control left and right turn lights of the vehicle. The lever might also be configured to allow selective dimming or brightening of the headlights of the vehicle. Other controls might include a knob positioned at the end of the lever to control such vehicle functions as turning on and off the headlights or parking lights of the vehicle. A control typically has electrical contact switches.

SUMMARY OF THE INVENTION

In general, in one aspect, the invention features an apparatus for use with a vehicle. The apparatus has an optical switch configured to furnish an electrical output and a mechanical control. The mechanical control has a selectable position for controlling a function of the vehicle. The control has a shutter positioned to control the electrical output of the optical switch based on the position of the control.

Implementations of the invention may include one or more of the following. The optical switch may include an optical transmitter and an optical receiver. The apparatus may further include a controller connected to receive the electrical output of the optical switch and activate the function.

The function may include illumination of a light bulb (e.g., a headlight or a parking light) and the mechanical control (e.g., a knob, a lever, or a button) may control an intensity level of light radiated from the light bulb. The function may include operation of a windshield wiper, and the mechanical control may control a speed at which the windshield wiper operates. The apparatus may be part of a steering column assembly. A control circuit may be connected to sense the position of the mechanical control based on the electrical outputs of the optical switches and furnish an indication of the position of the mechanical control. A control module may be connected to receive the indication from the control circuit and control the function based on the indication.

In general, in another aspect, the invention features a method for use with a vehicle having a mechanical control having a selectable position for controlling a function of the vehicle. The control has a shutter. The method includes transmitting light along an optical path intercepted by the shutter when the control is placed in a predetermined position. The method also includes determining the position of the control based on the amount of light intercepted by the shutter. The method may also include determining the position of the control based on the amount of light intercepted by the shutters.

Among the advantages of the invention are one or more of the following: reduced mechanical wear of the switches, fewer wires extending from the controls and fewer switches.

It is an important object of the invention to provide improved vehicle switching control.

Other objects, advantages and features will become apparent from the following detailed description and from the claims when read in connection with the accompanying drawings in which:

BRIEF DESCRIPTION OF THE DRAWINGS

FIGS. 10A–B are side views of the apparatus of FIG. 7;

DETAILED DESCRIPTION

Figure 1:
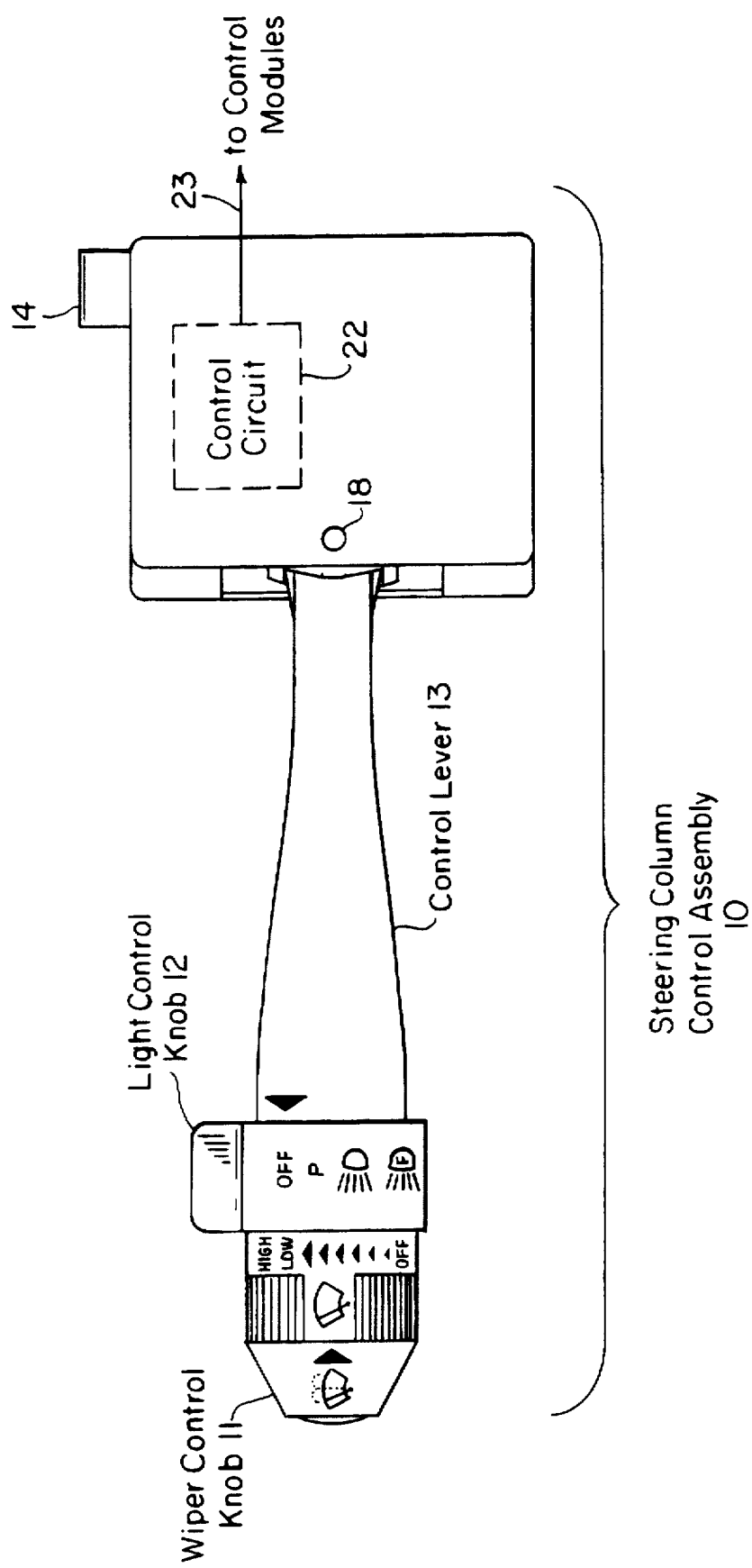
FIG. 1 is a front plan view of a steering column control assembly according to the invention.
Figure 2:
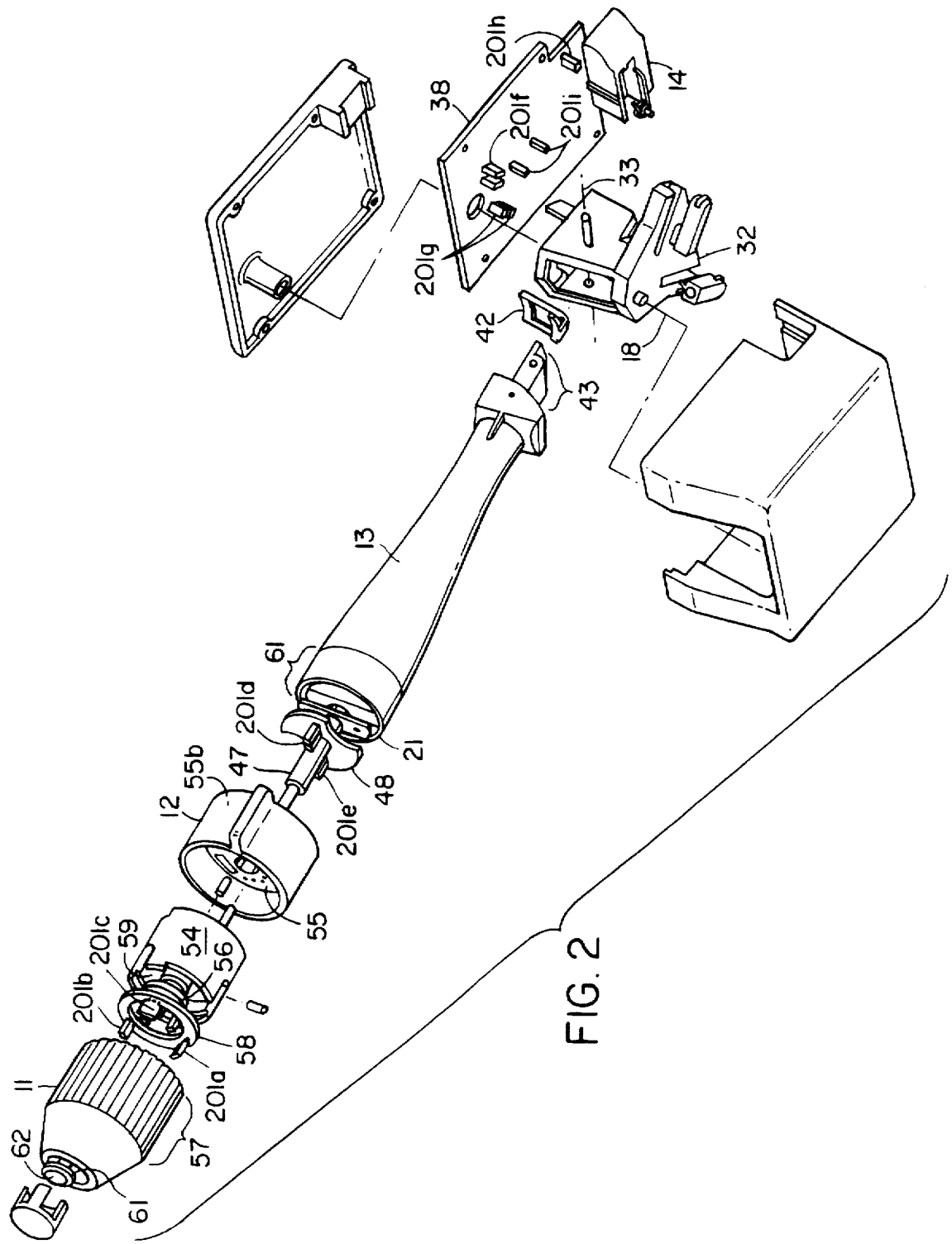
FIG. 2 is an exploded view of the steering column control assembly of FIG. 1.

As shown in FIGS. 1 and 2, nine optical switches 201a–i are arranged throughout a steering column control assembly 10 to furnish indications of the positions of user operable controls 11–14 (e.g., wiper control knob 11, light control knob 12, control lever 13 and hazard button 14) of a vehicle. The indications furnished by optical switches 201a–i are encoded. A control circuit 22 decodes the indications furnished by optical switches 201a–i to determine the positions of controls 11–14. From this determination, control circuit 22 interacts with control modules 160–168 (FIG. 12) to control characteristics (e.g., wiper speed) of functions (e.g., operation of windshield wipers) of the vehicle associated with controls 11–14.

Figures 13, 14, 15, 16, 17, 18:
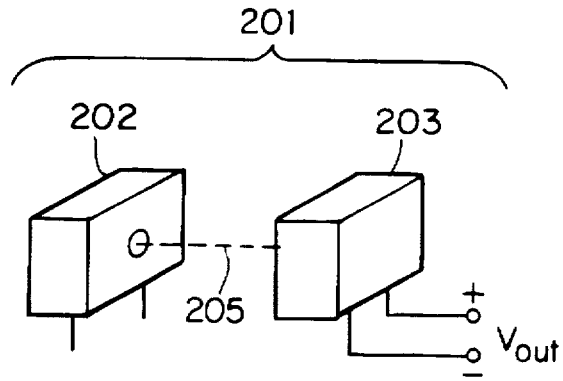
FIGS. 13–17 are tables illustrating optical encoding performed by the steering column assembly.
FIG. 18 is a schematic diagram of an optical switch according to the invention.

As shown in FIG. 18, optical switches 201a–i (of design 201) include infrared, optical transmitters 202a–i (of design 202), respectively, and associated infrared optical receivers 203a–i (of design 203), respectively. Each receiver 203 is positioned to receive light from its associated transmitter 202 if an optical path 205 between transmitter 202 and receiver 203 is unobstructed. If unobstructed, switch 201 is "open," and an output signal $V_{OUT}$ is activated. If obstructed, switch 201 is "blocked," and the output signal $V_{OUT}$ is deactivated.

For purposes of encoding the position of controls 11–14 via the switches 201a–i, shutters are mounted to controls 11–14 and positioned to selectively block and open switches 201a–i, depending on the position of each control. The combined states (opened or blocked) of three (201a–c) of switches 201a–i uniquely identify the position of wiper control knob 11. The combined states of two (201d–e) of switches 201a–i uniquely identify the position of light control knob 12. The combined states of two (201f–g) of switches 201a–i uniquely identify the vertical position of lever 13. The state of switch 201h uniquely identifies the horizontal position of lever 16. The state of switch 201i uniquely identifies the horizontal position of lever 13.

For purposes of controlling a windshield wiper of the vehicle, wiper control knob 11 has seven positions. The farthest counterclockwise position of knob 11 turns the windshield wiper off. When rotating knob 11 in a clockwise fashion from its farthest counterclockwise position, the positions of knob 11 are associated with the following characteristics of the windshield wiper: a 15-second delay interval, a ten second delay, a five-second delay, a two-second delay, a low speed and a high speed, respectively. Depressing wiper control knob 11 inward toward control lever 13 activates a pump that sprays fluid on the windshield.

For purposes of controlling external lights of the vehicle, light control knob 12 has four positions. The farthest counterclockwise position of knob 12 turns on the parking lights, turns on the headlights at low beam, and turns on the fog lights. When rotating knob 12 in a clockwise fashion from its farthest counterclockwise position, the positions of knob 12 are associated with the following characteristics of the lights: turning on the parking lights and headlights at low beam; turning on the parking lights; and turning all lights off.

For purposes of controlling turn signals of the vehicle, lever 13 is capable of pivoting between three positions about a horizontal axis 18. When lever 13 is horizontal, both turn signals are off. When lever 13 is pulled down, the left turn signal is activated. When lever 13 is pushed upward, the right turn signal is activated.

For purposes of controlling the hazard lights of the vehicle, button 14 has two positions. When button 14 is depressed, the hazard lights are activated. When button 14 is not depressed, the hazard lights are deactivated.

For purposes of controlling the intensity of the headlights of the vehicle, lever 13 is capable of pivoting between two positions about a vertical axis 33. When lever 13 moves forward, the high beam lights of the headlights are activated. When lever 13 moves backward, the low beam lights of the headlights are activated.

Wiper control knob 11 is located near a free end 21 of lever 13 and rotates about a hollow shaft 47. Shaft 47 is coaxial with the longitudinal axis of lever 13 and extends from the end 21 of lever 13. Wiper control knob 11 is secured to shaft 47 via a screw 62 and a lock washer 61. The inner surface of shaft 47 houses wire extending from switches 201a–i, and the exterior surface of shaft 47 extends through knobs 11 and 12, as described below. Knob 11 has a hollow cylindrical section 57 near the end of knob 11 closest to lever 13, which is coaxial with shaft 47.

A generally cylindrical hub 54 extends into section 57 and allows knob 11 to rotate about hub 54. Circuit board 58, in the shape of a ring having approximately the same diameter as hub 54, is coaxial with shaft 47 and mounted on an end 59 of hub 54 extending the furthest into section 57. Optical transmitters 202a–c are mounted to circuit board 58. Circuit board 58 circumscribes another ring-like circuit board 56 mounted to the end 59. Circuit board 56 is coaxial with shaft 47 and has three optical receivers 203a–c uniformly spaced from their associated optical transmitters 202a–c.

Figure 3:
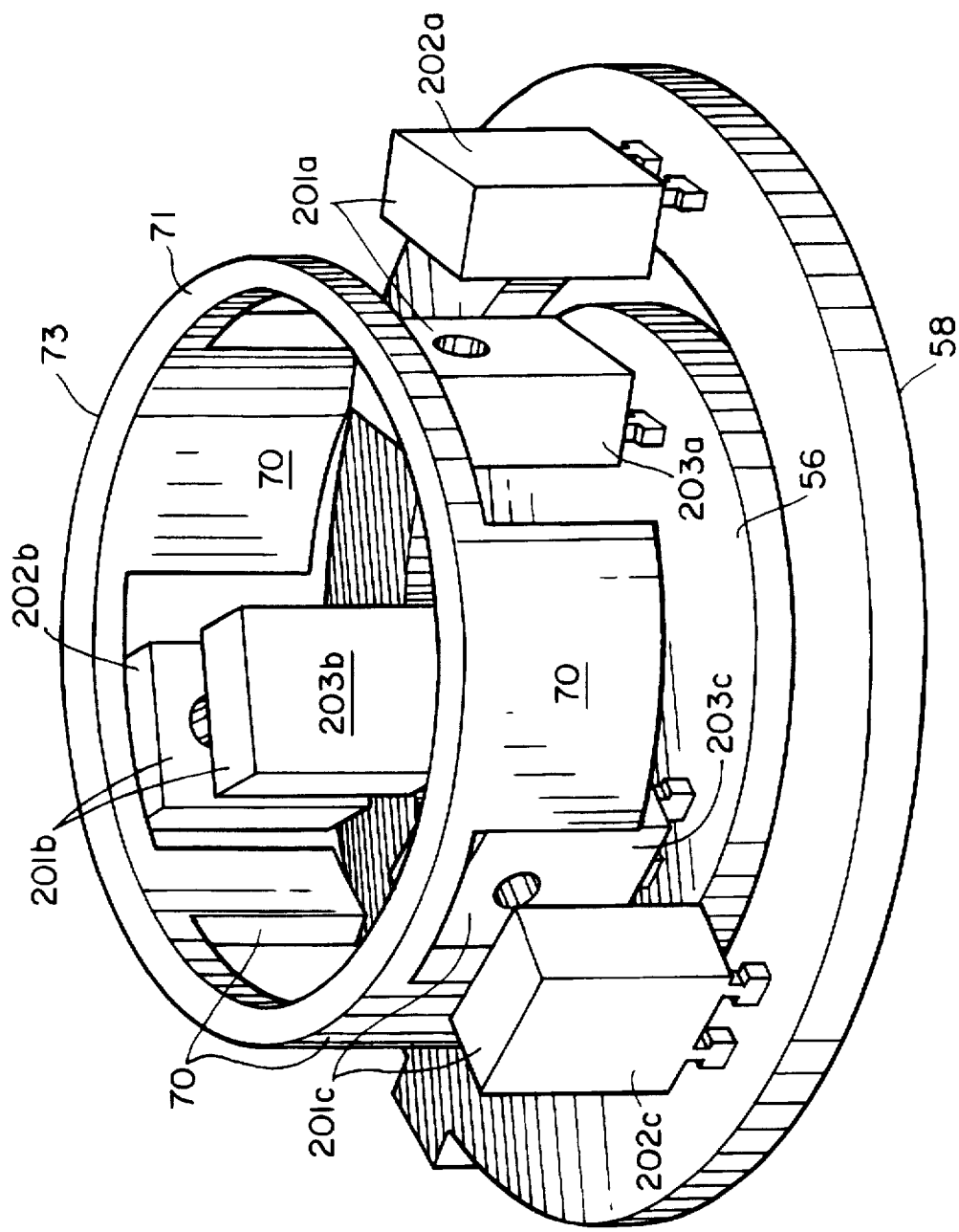
FIG. 3 is a perspective view of an apparatus to encode the positions of a wiper control knob in the control assembly of FIG. 1.
Figure 4A:
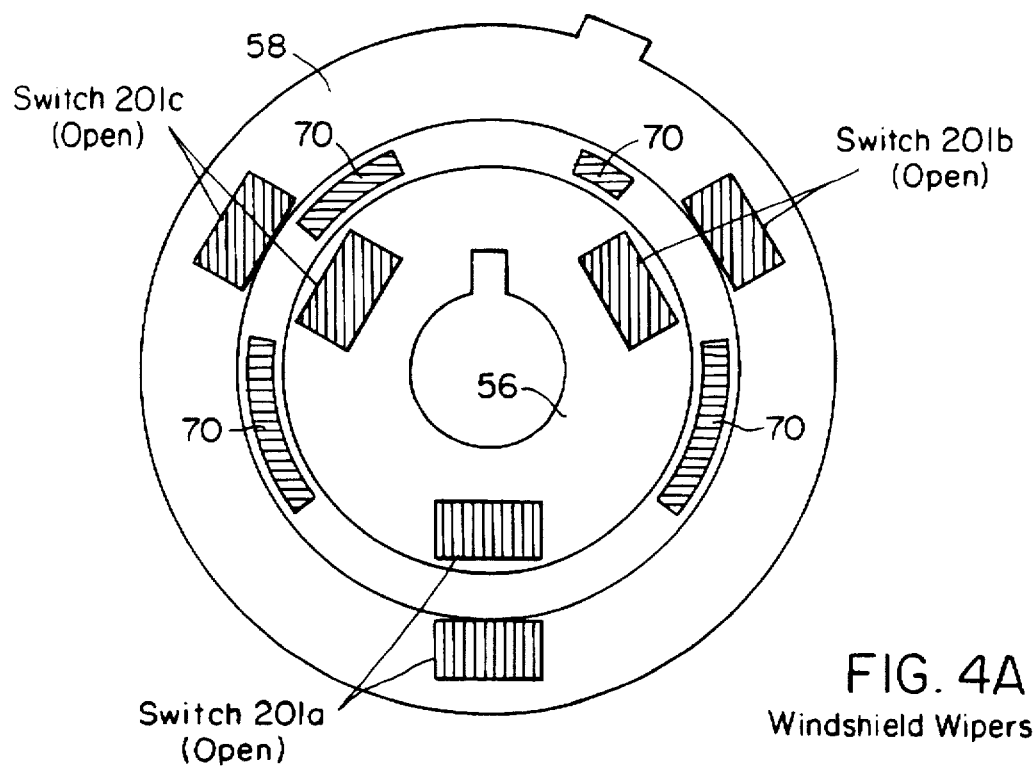
FIGS. 4A–H are top plan views of the apparatus of FIG. 3 illustrating encoding by the apparatus.
Figure 4B:
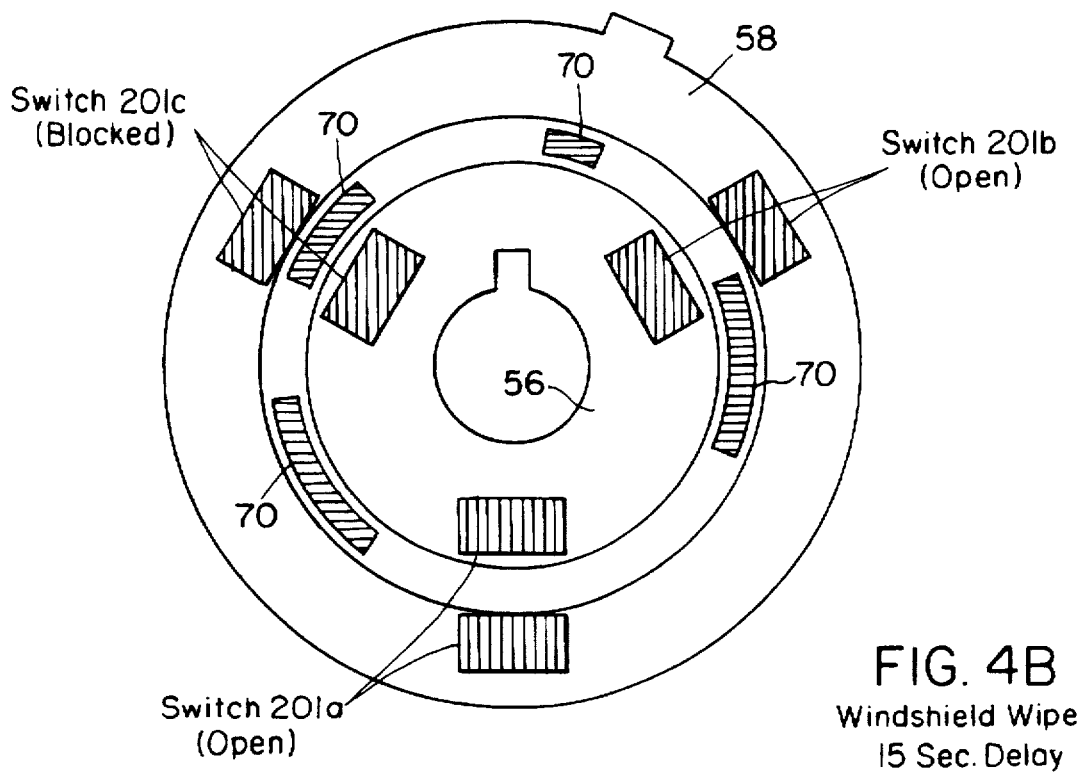
Figure 4C:
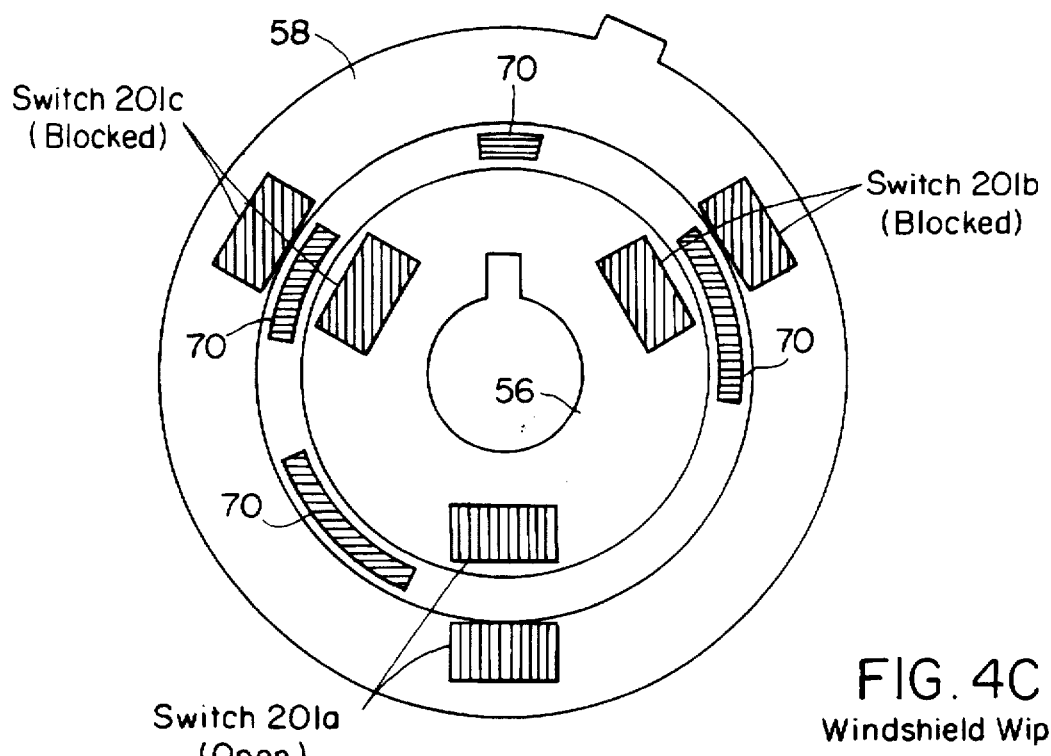
Figure 4D:
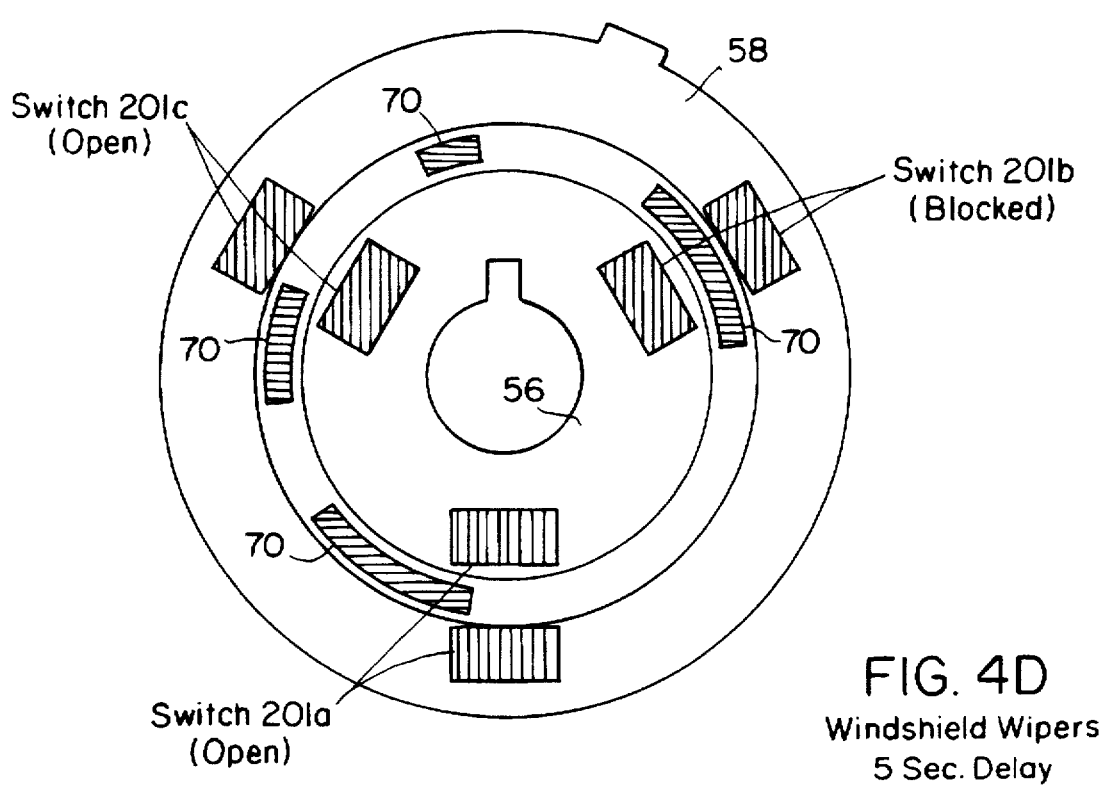
Figure 4E:
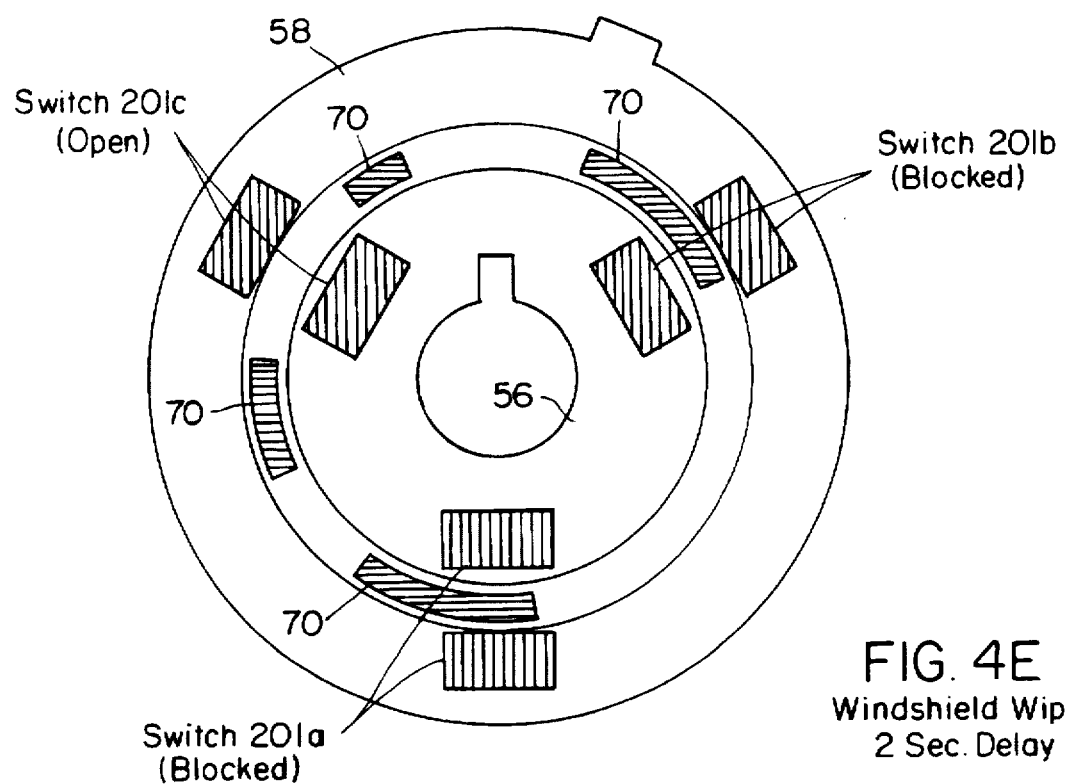
Figure 4F:
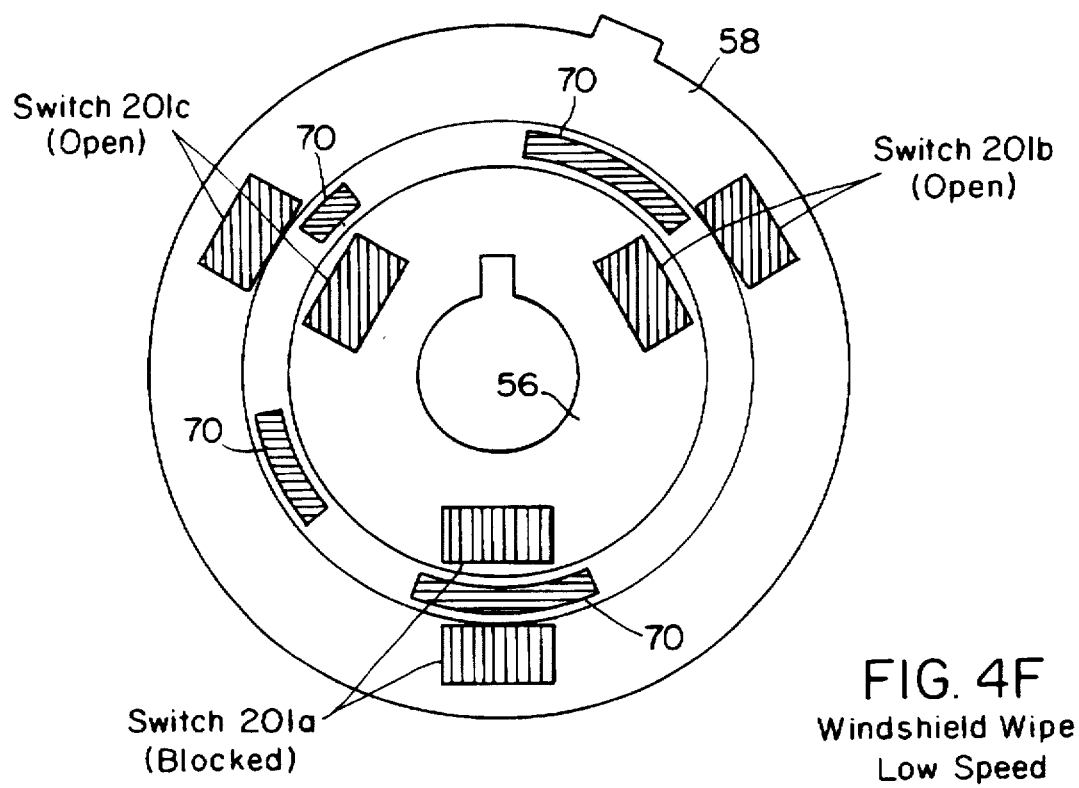
Figure 4G:
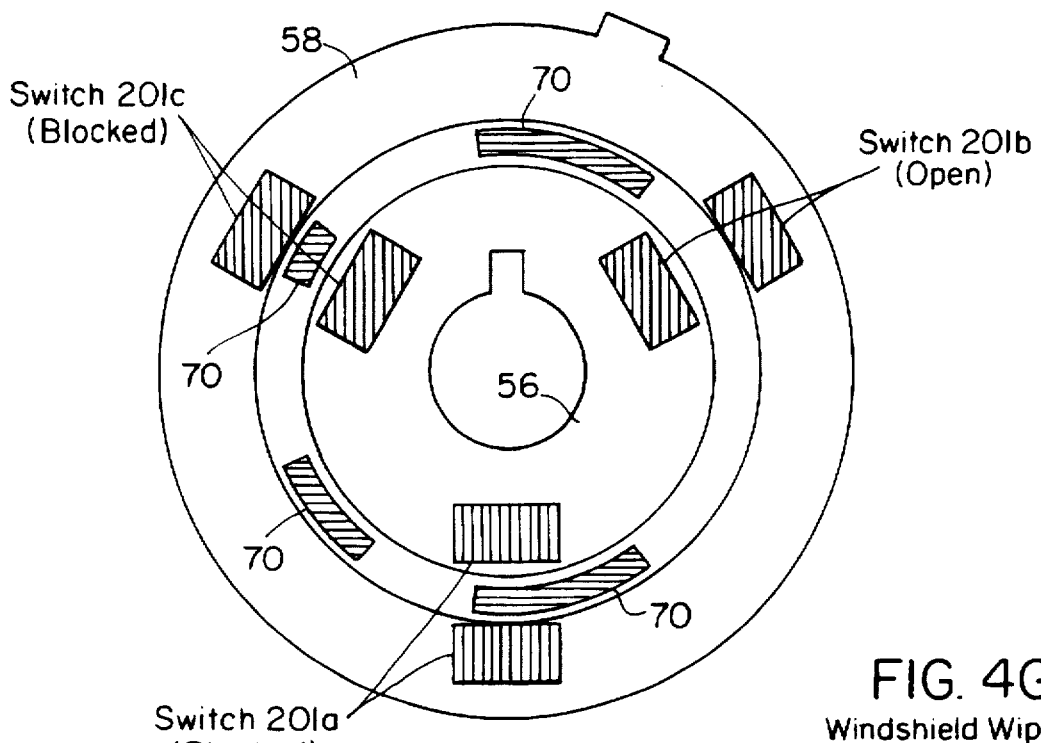
Figure 4H:
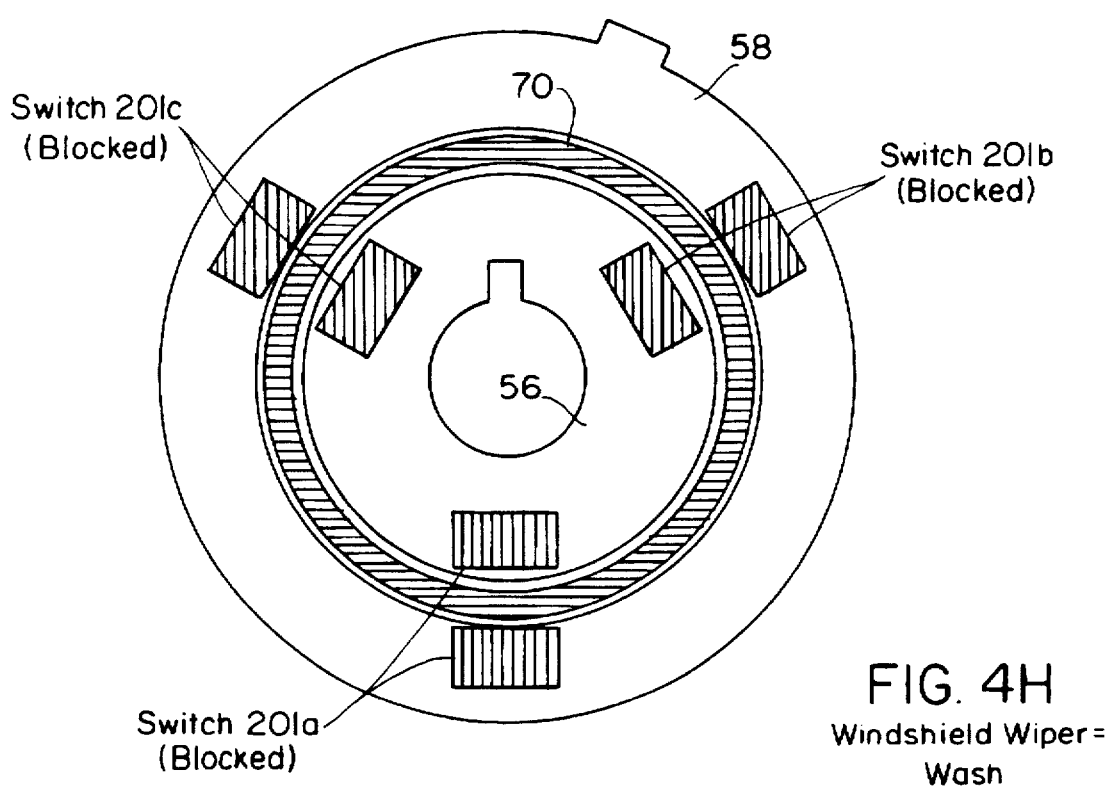
Figure 5:
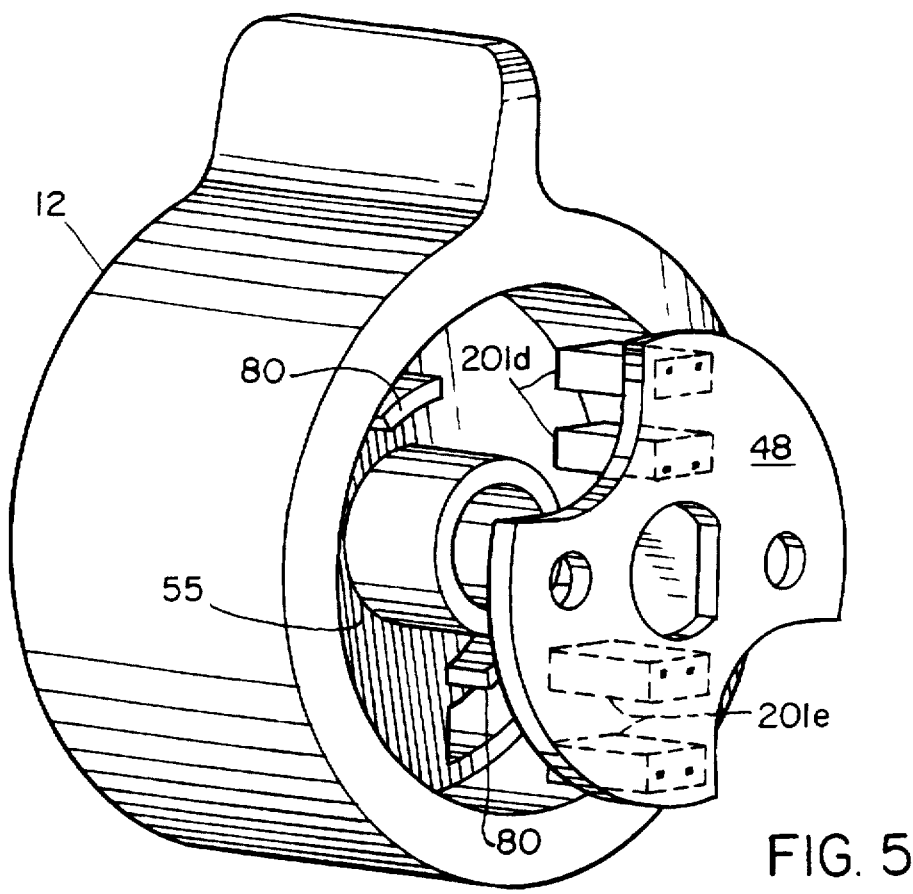
FIG. 5 is a perspective view of an apparatus to encode the positions of the light control knob in the control assembly of FIG. 1.

As shown in FIG. 3, a shutter assembly 73, mounted to the interior surface of hollow section 57, selectively opens and closes switches 201a–i, depending on the position of wiper control knob 11. Shutter assembly 73 includes a ring-like shutter 71 coaxial with shaft 47. Four arcuate shutters 70 extend an equal distance from shutter 71 toward hub 54. The surface area (which varies by shutter 70) and spacing of shutters 70 allow shutter assembly 73 to selectively open and close switches 201a–c. Gaps between adjacent shutters 70 permit light communication between transmitters 202a–c and receivers 203a–c determined by the position of knob 11, and shutters 70 block light communication between transmitters 202a–i and receivers 203a–i determined by the position of knob 11.

As shown in FIGS. 4A–H and 13, rotation of control knob 11 to a position where shutters 70 open all of the switches 201a–c indicates the off position for the windshield wipers. Rotating the control knob 11 to a position where shutters 70 open switches 201a–b and block switch 201c, indicates the 15-second delay position. Rotting control knob 11 to a position where switches 201b–c are blocked and switch 201a is open, indicates the ten-second delay position. Rotating control knob 11 to a position where shutters 70 open switches 201a and 201c and blocks switch 201b, indicates the five-second delay position. Rotating control knob 11 to a position where shutters 70 block switches 201a–b and open switch 201c, indicates the two-second delay position for the windshield wipers. Rotating control knob 11 to a position where switch 201a is blocked and switches 201b–c are open, indicates the low speed position. Rotating control knob 11 to a position where switches 201a and 201c are blocked and switch 201b is open, indicates the high speed position. When control knob 11 is depressed, shutter 70 blocks all switches 201a–c to indicate the wash position.

As shown in FIG. 2, light control knob 12 is generally cylindrical and coaxial with shaft 47 which extends therethrough. Light control knob 12 is located between lever 13 and wiper control knob 11. Knob 12 has a first cylindrical recess 55 which receives and circumscribes portions of knob 11 and hub 54. Knob 12 also has a second cylindrical recess 59 which receives a cylindrical section 61 (located near the end 21) of lever 13 about which knob 12 rotates.

For purposes of encoding the position of knob 12, two shutters 80 extend from recess 59 toward lever 13. Circuit board 48 positions switches 201d–e located thereon and allows switches 201d–e to interact with shutters 80. Shaft 47 extends through the circuit board and secures circuit board 48 in a fixed position. Therefore, rotation of knob 12 selectively opens and blocks switches 201d–e.

As shown in FIGS. 6A–D and 14, moving control knob 12 to position shutters 80 where switches 201d–e are both open, indicates the lights off position. When moving control knob 12 to position shutters 80 where switch 201d is blocked, and switch 201e is open, indicates the parking lights on position. When moving control knob 12 to position control knob 12 where switches 201d–e are both blocked, indicates the parking lights on and the low beam lights on. When moving control knob 12 to position shutters 80 where switch 201d is open and switch 201e is blocked, indicates the parking lights on, low beam lights on and fog lights on.

Figure 7:
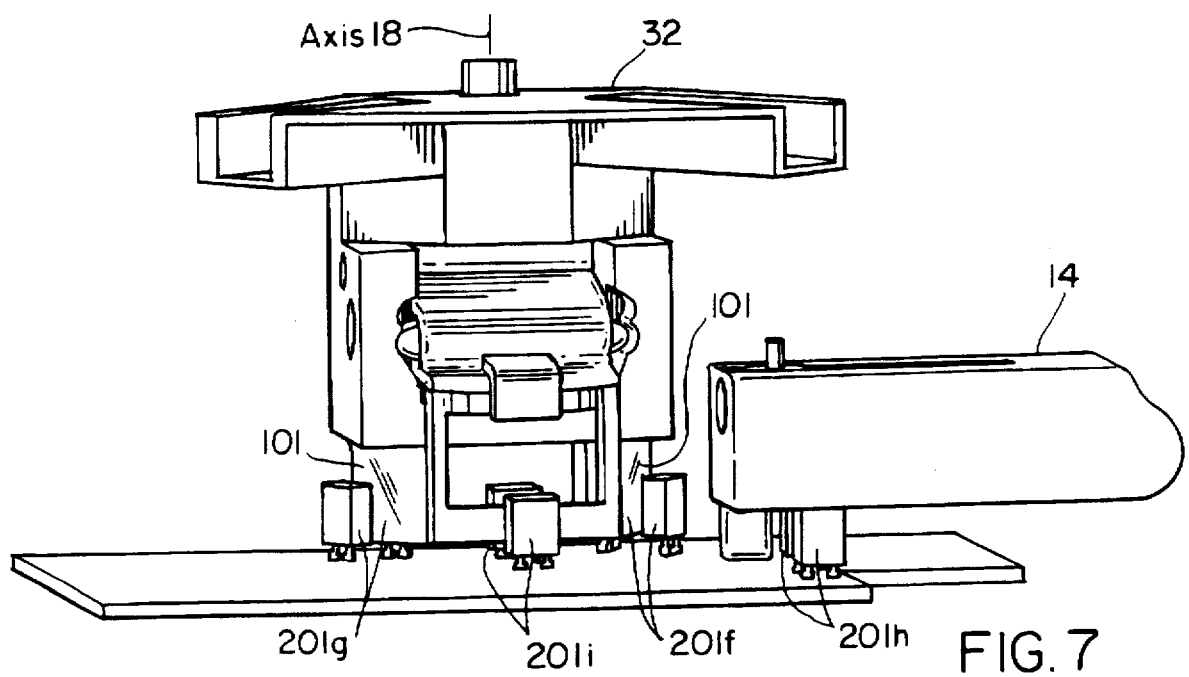
FIG. 7 is a perspective view of an apparatus to encode positions of the lever and hazard buttons in the control assembly of FIG. 1.
Figure 6A:
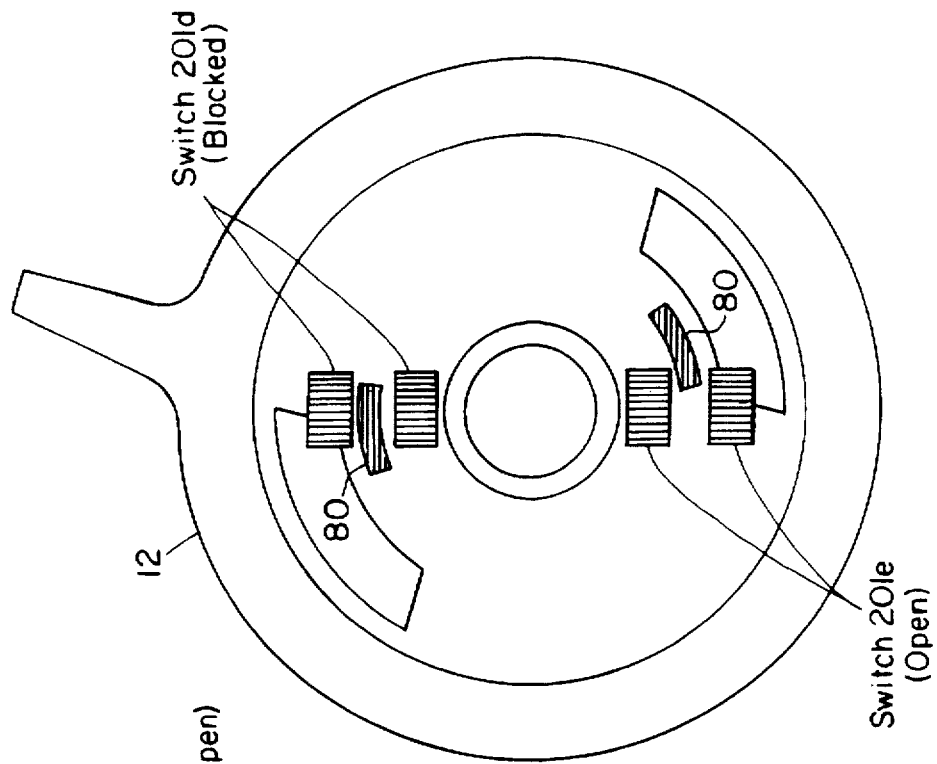
FIGS. 6A–D are top plan views of the apparatus of FIG. 5 illustrating encoding by the apparatus.
Figure 6B:
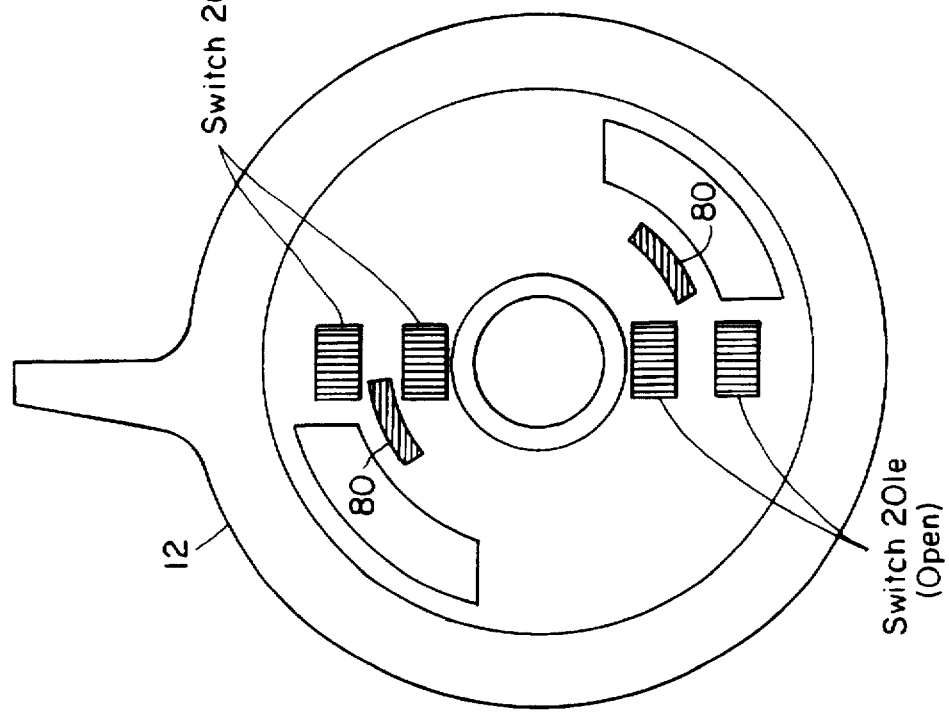
Figure 6D:
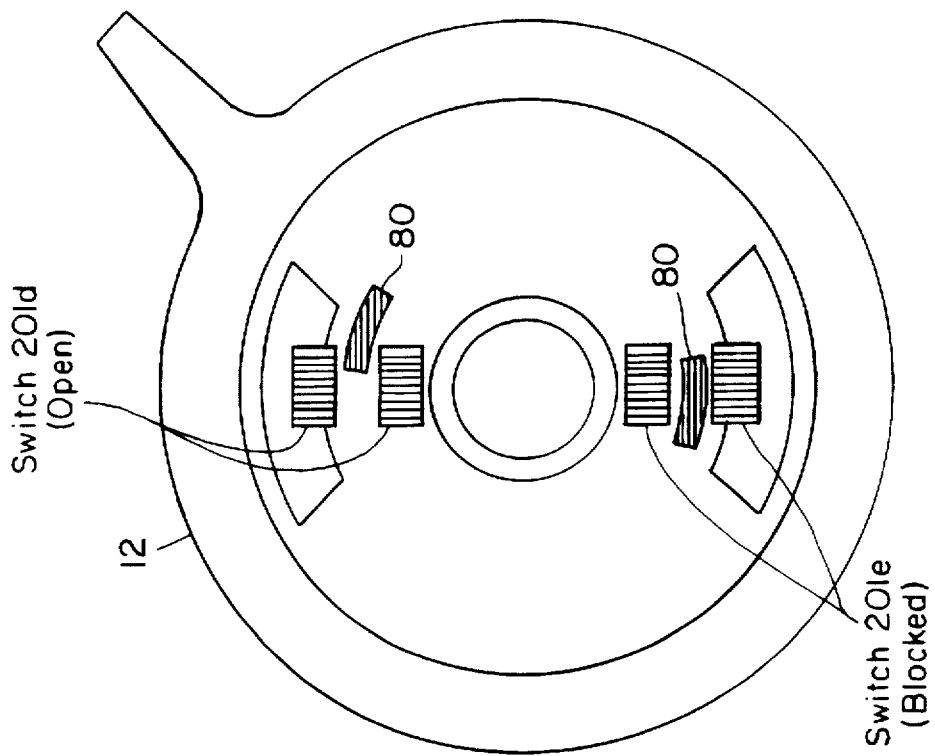
Figure 6C:
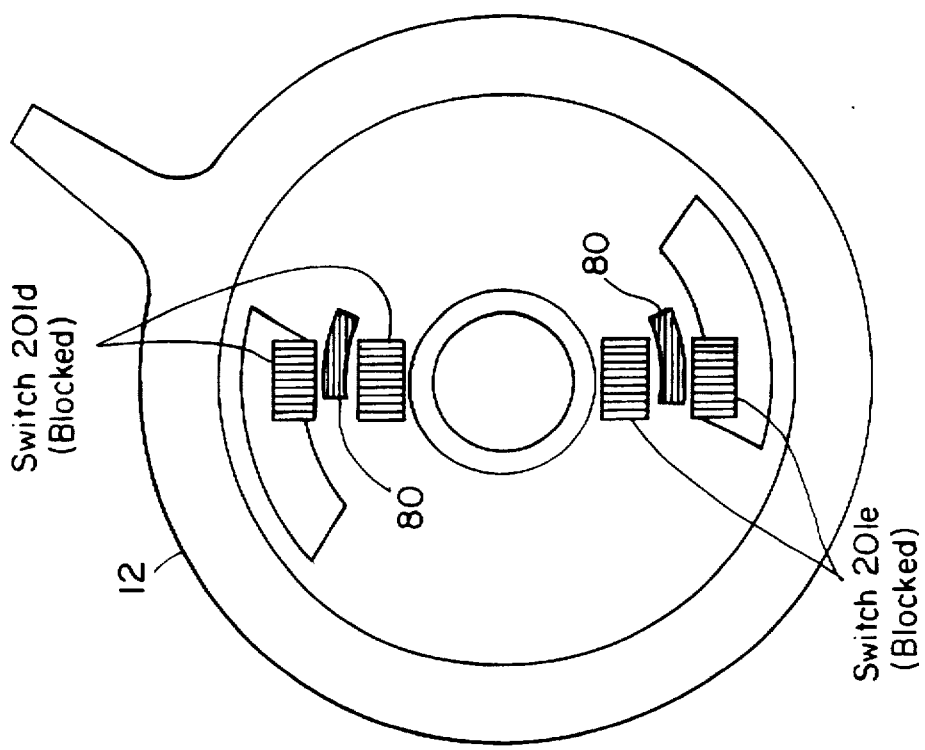
Figure 8A:
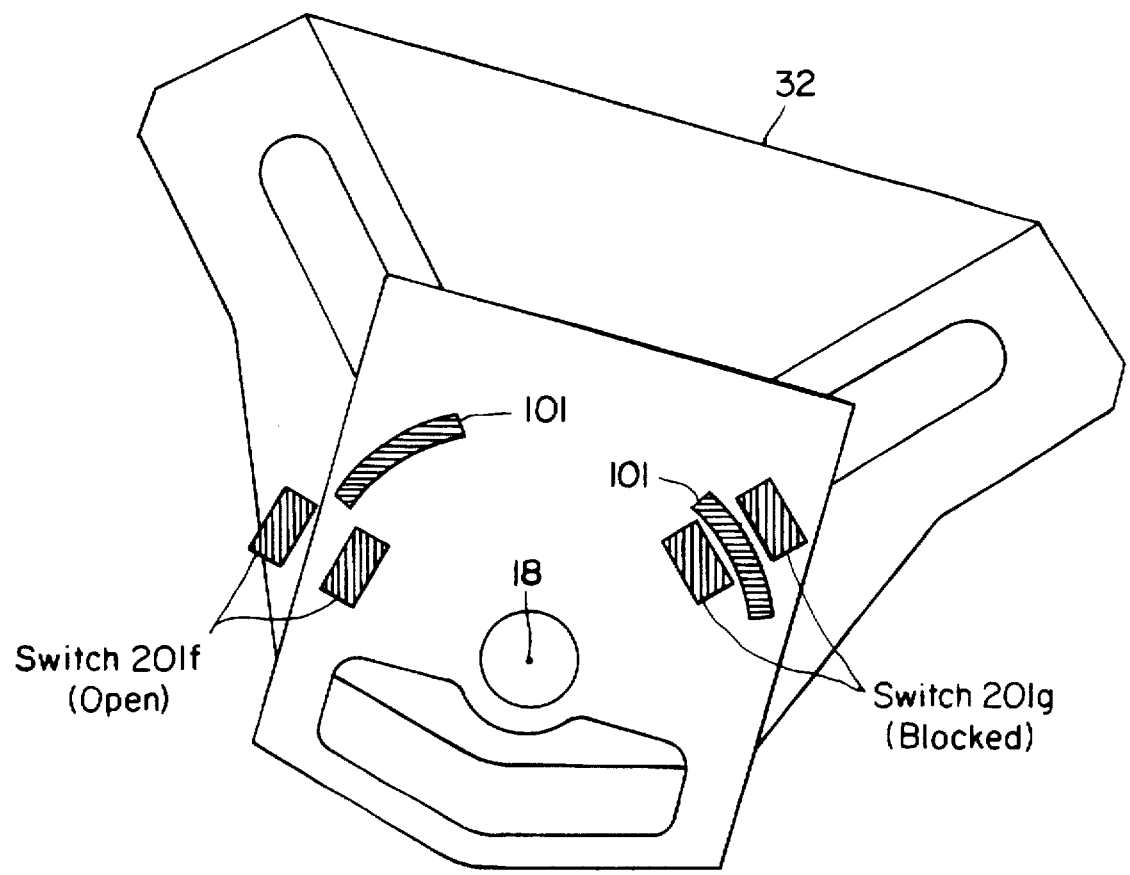
FIGS. 8A–C and 9A–B are top plan views illustrating encoding by the apparatus shown in FIG. 7.
Figure 8B:
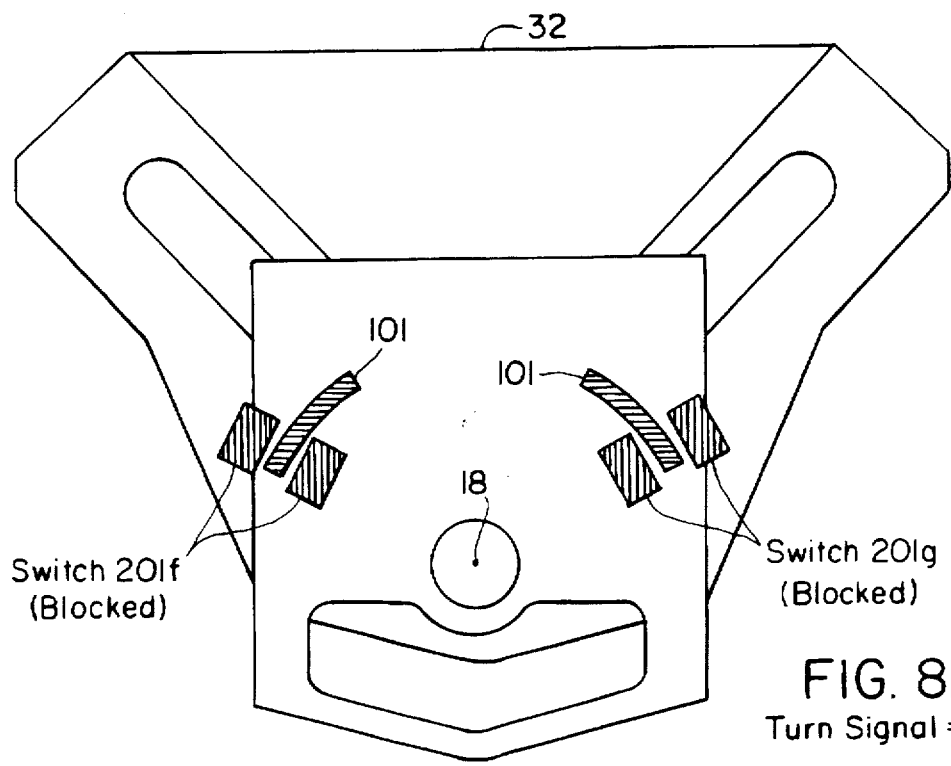
Figure 8C:
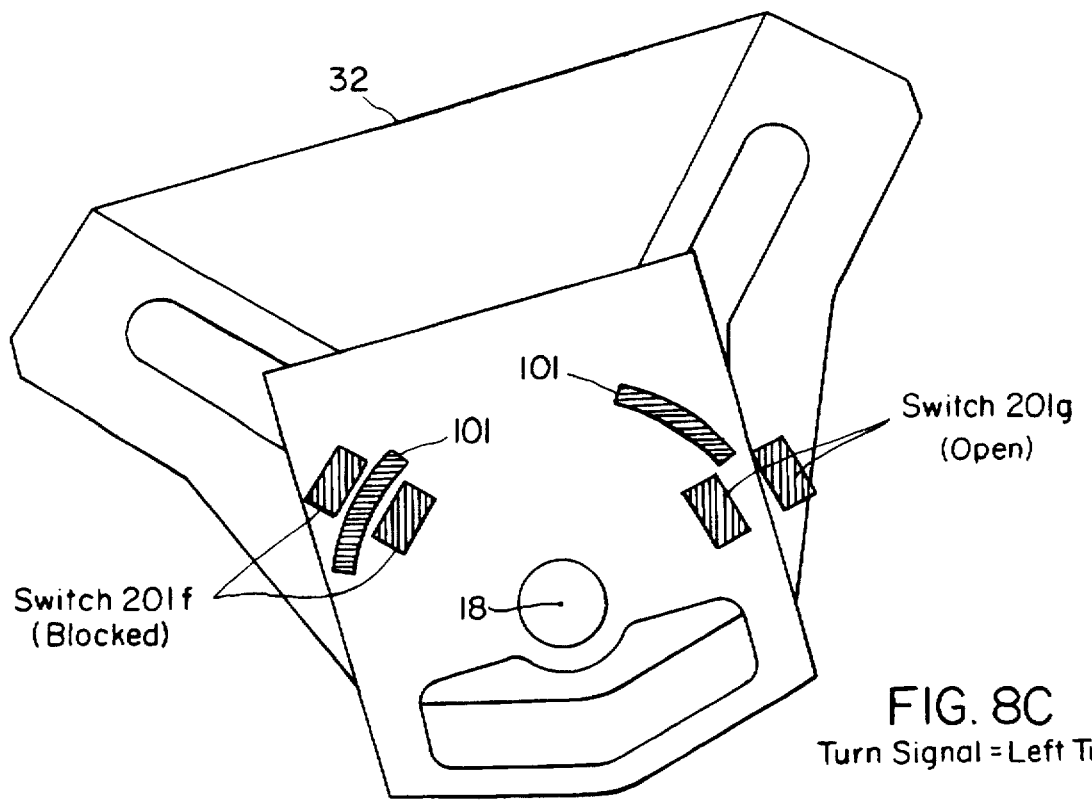

As shown in FIGS. 2 and 7, vertical movement of control lever 13 about axis 18 rotates yoke 32 which is pivotally mounted about axis 18. Two shutters 101 of yoke 32 interact with switches 201f–g, which are located on circuit board 38 perpendicular to axis 18. As shown in FIGS. 8A–C and 15 when shutters 101 are positioned where switch 201f is open and switch 201g is blocked, lever 13 is in the right turn position. When shutters 101 are positioned where switches 201f–g are both blocked, lever 13 is in the turn signal off position. When shutters 101 are positioned where switch 201f is blocked and switch 201g is open, lever 13 is in the left turn position.

Figure 9B:
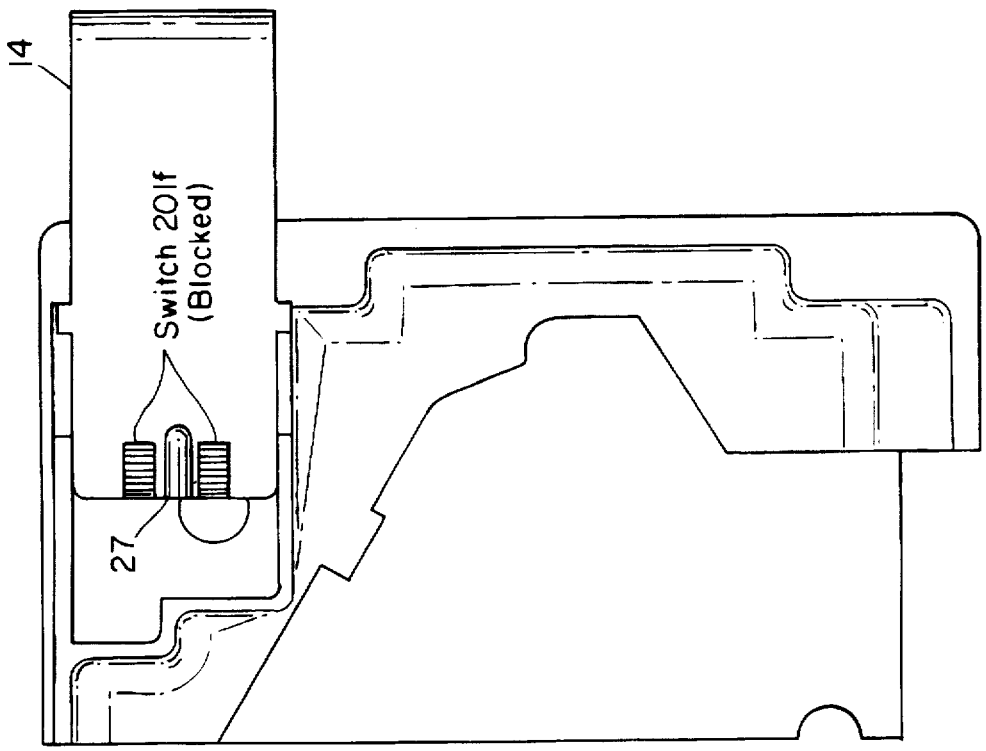
Figure 9A:
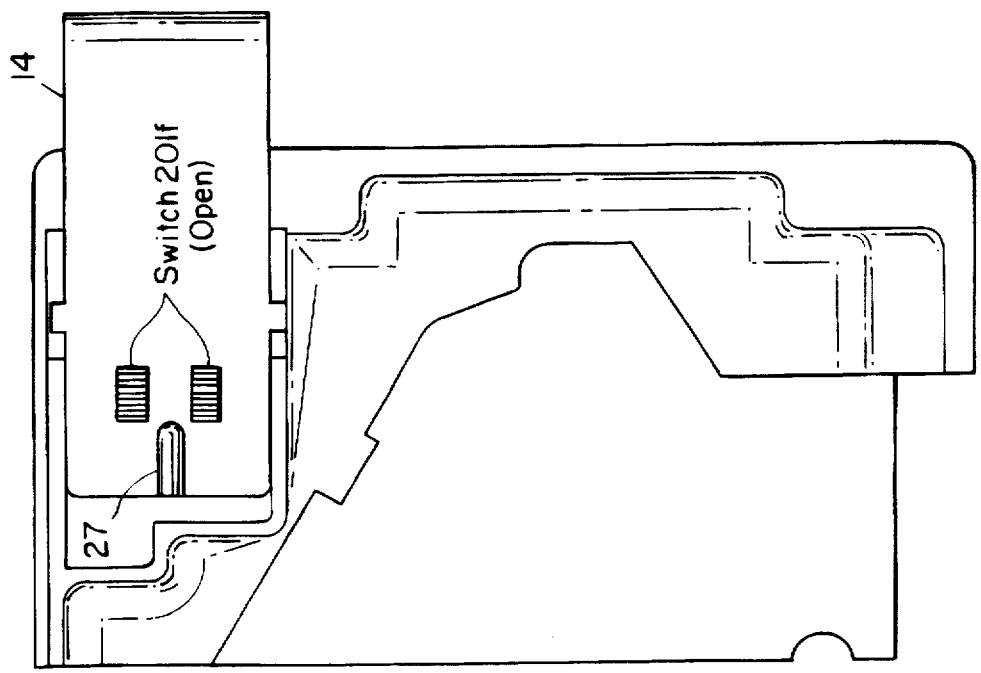

As shown in FIGS. 9A–B and 16, hazard button 24 has a shutter 27 used to interact with switch 201h mounted on circuit board 38. When hazard button 24 is not depressed (hazard off), shutter 27 is positioned such that switch 201h is open. When hazard button 24 is depressed (hazard on), shutter 27 is positioned such that switch 201h is blocked.

Figure 10A:
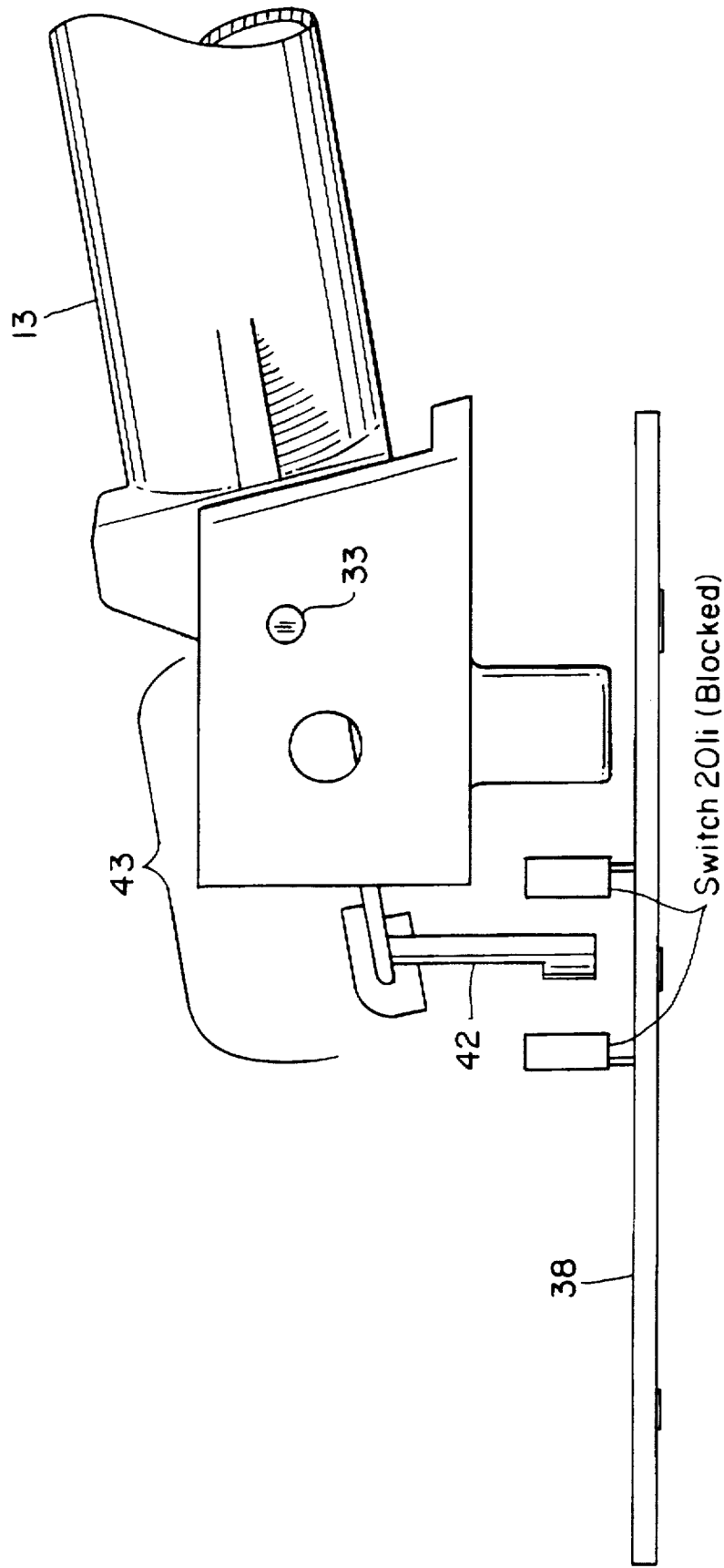

As shown in FIGS. 10A–B and 17, circuit board 38 also includes switch 201i which interacts with shutter 42 to selectively turn on and off the high beam lights. Lever 13 pivots about vertical axis 33 to actuate the high beam lights of the vehicle. Lever 13 has an extension 43 parallel with lever 13 that is located on the opposite side of axis 33 from lever 13. Shutter 42 extends from extension 43 toward circuit board 38. When lever 11 is in its resting position, shutter 42 is positioned such that switch 201i is blocked which indicates the high beam off position. When lever 11 is pulled toward the driver, shutter 42 is positioned such that switch 201i is opened which indicates the high beam on position.

Figure 11:
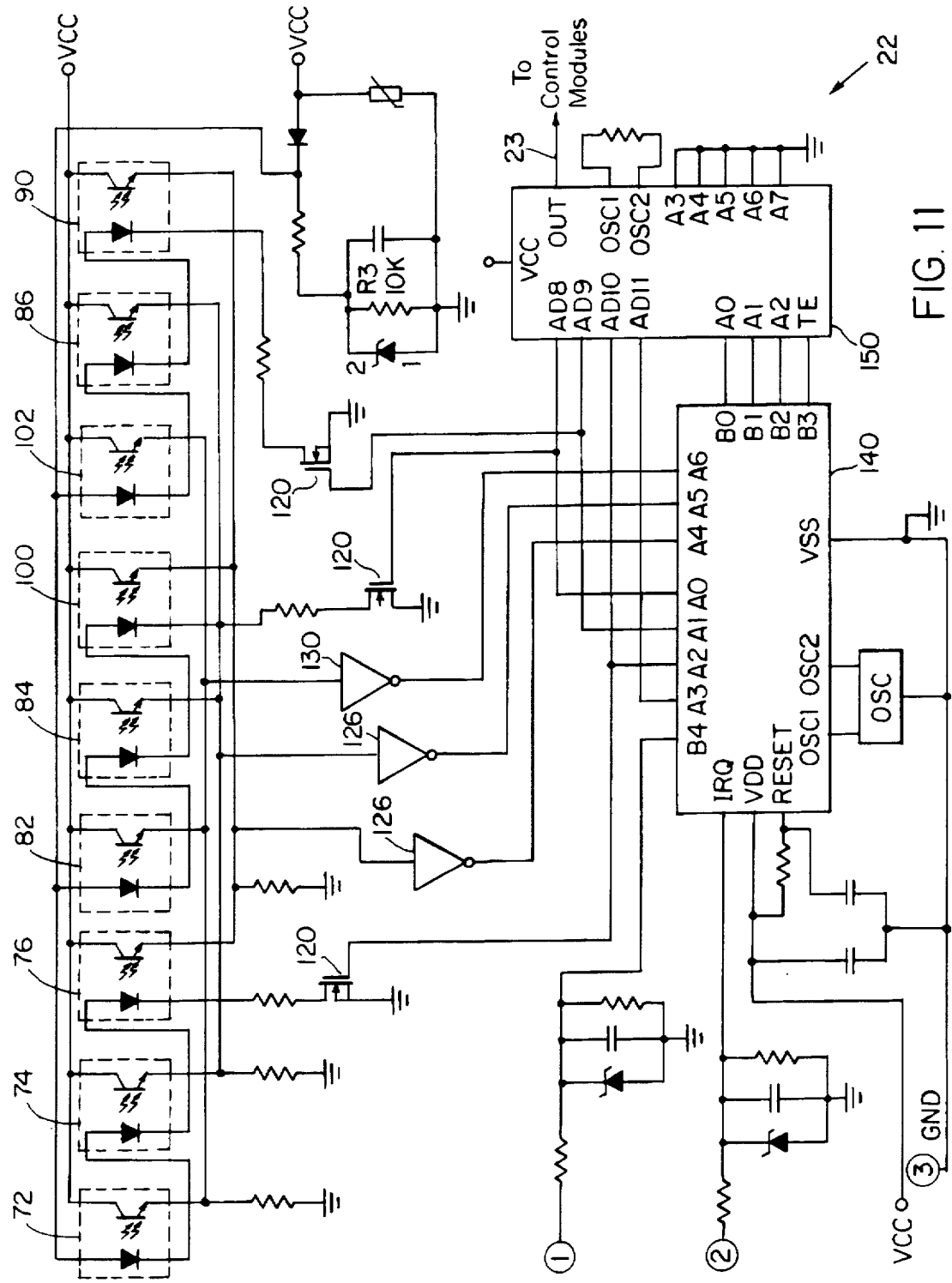
FIG. 11 is a schematic diagram illustrating the control circuit in the control assembly of FIG. 1.

As shown in FIG. 11, for purposes of monitoring the states (open or blocked) of switches 201a–i, control circuit 22 includes a microcontroller 140. Microcontroller 140 is configured to sequentially read the status of switches 201a–i, three at a time. Switches 201a–i are arranged into three groups: (1) wiper control knob 11 switches 201a–c; (2) light control knob 12 switches 201d–e and hazard control switches 201h; and (3) turn signal switches 201f–g and high beam switch 201i. Each group is sequentially activated by microcontroller 140 as microcontroller 140 continuously scans the groups.

Transmitters 202 of each group are serially connected and coupled between a voltage level and ground by a field-effect-transistor 120 (one for each group). Once activated, microcontroller 140 reads the status (open or blocked) of the switches of the selected group. The three outputs for the selected group are coupled to microcontroller 140 via three inverting buffers 130 (one for each output). As an example, in order to read the group including switches 201a–c, microcontroller 140 activates transistor 120 to turn on transmitters 202a–c for this group. The outputs of buffers 130 indicate the status of switches 201a–c.

Microcontroller 140 communicates the status of switches 201a–i to microcontroller 150 which forms a message that sends this status to control modules 160–168 via control bus 23. The data sent to bus 23 by microcontroller 150 includes an identifier to identify the appropriate control module and data for the control module indicating the appropriate action to be taken.

Figure 12:
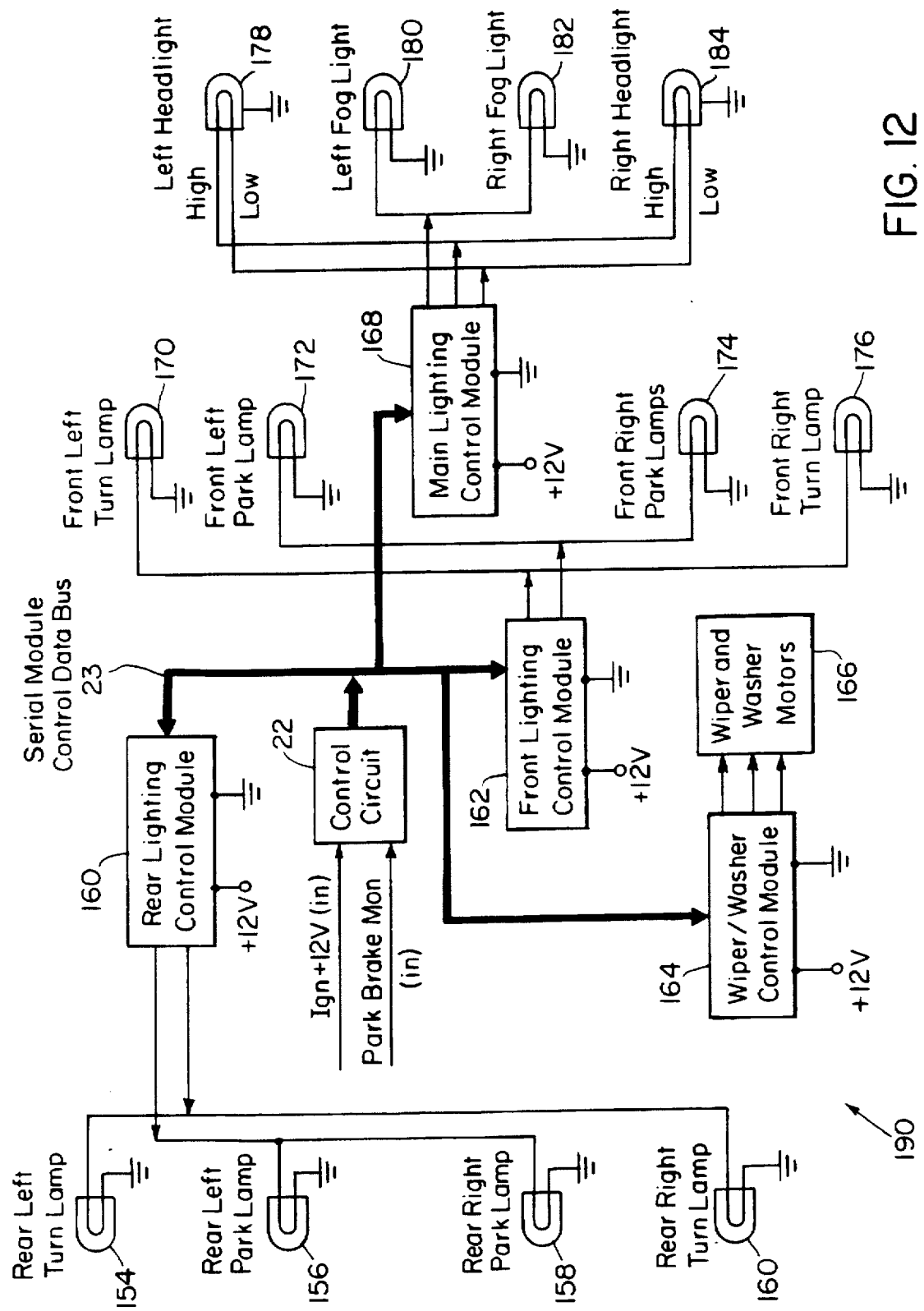
FIG. 12 is a block diagram of an automobile control system.

As shown in FIG. 12, an electrical system 190 for the vehicle includes rear lighting control module 152 (coupled to bus 23) that controls rear left turn lamp 154, left park lamp 156, rear right park lamp 158, and rear right turn lamp 160. Wiper/washer control module 164 (coupled to the bus 23) controls wiper and washer motors 166. Front lighting control module 162 (coupled to bus 23) controls operation of front left turn lamp 170, front left park lamp 172, front right park lamp 174 and front right turn lamp 176. Main lighting control module 168 receives information from bus 23 and controls left head lamp 178, left fog light 180, right fog light 182 and right head lamp 184.

Figure 19:
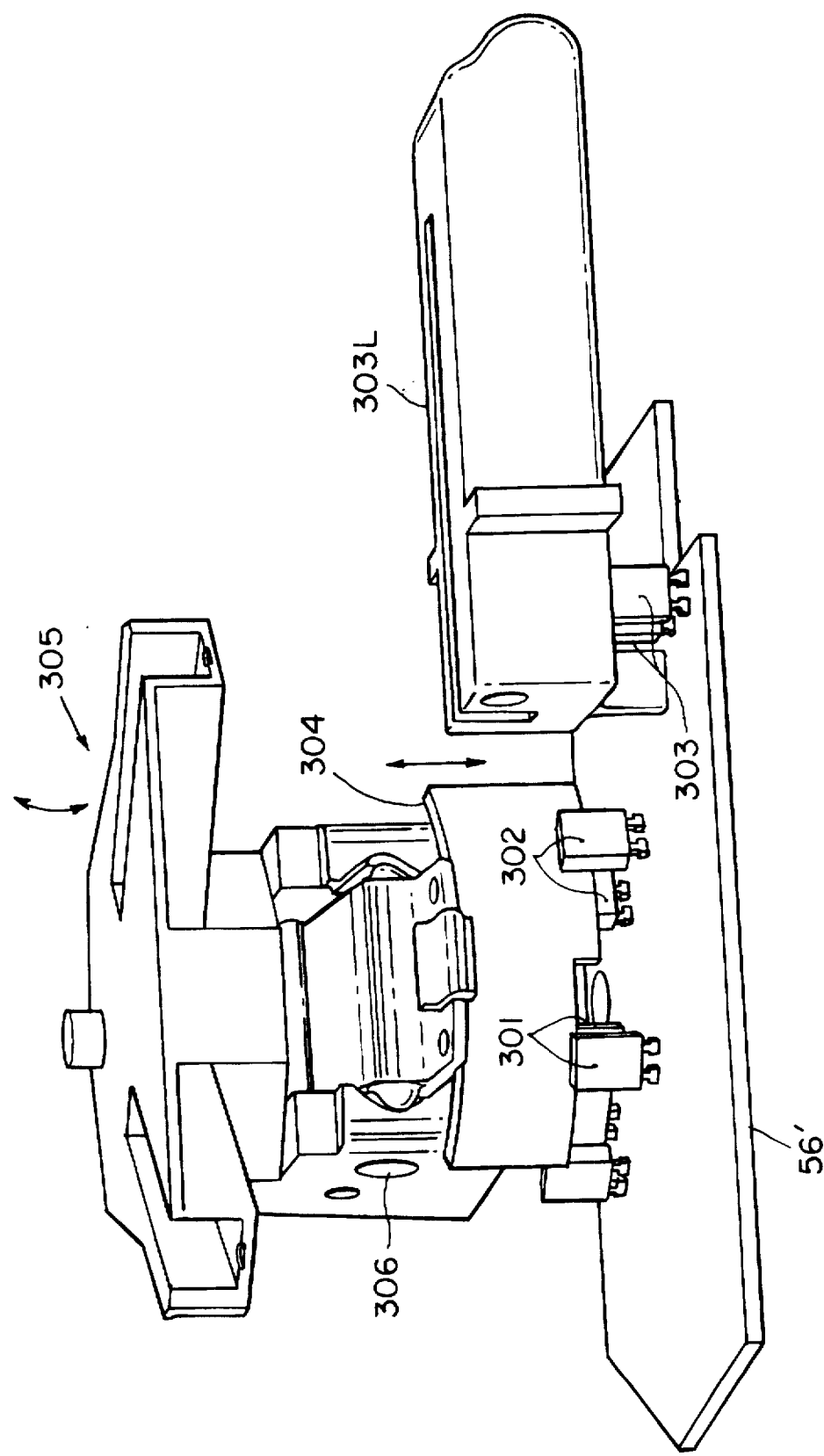
FIG. 19 is pictorial perspective view of another embodiment of the invention for selectively flashing clearance and headlights.

Referring to FIG. 19, there is shown a pictorial perspective view of a modification of the embodiment of the invention described above which involves the addition of photoelectric transducers to control truck clearance lights around the truck perimeter that may be flashed during both day and night for signalling. Circuit board 56' high low optical switch 301 for controlling high beam and low beam, clearance optical switch 302 for controlling clearance lights and hazard optical switch 303 operated by hazard switch lever 303L. Shutter 304 is connected to the control mechanism 305 and pivotal about pivot 306 and rotatable about an axis orthogonal to the axis of pivot 306 so that pushing the control lever (307 FIG. 20) away from the driver momentarily flashes the clearance lights on when the light control ring is in the off position for day signalling and pushing the lever away from the driver momentarily flashes the clearance lights off when the control ring is in any of the on positions for night signalling. Pulling the lever towards the driver momentarily flashes the high beam lights with the light control ring in either the off or park positions. Pulling the lever towards the driver alternately latches between low and high beam when the light control ring is in either of the off or park positions.

Figure 20:
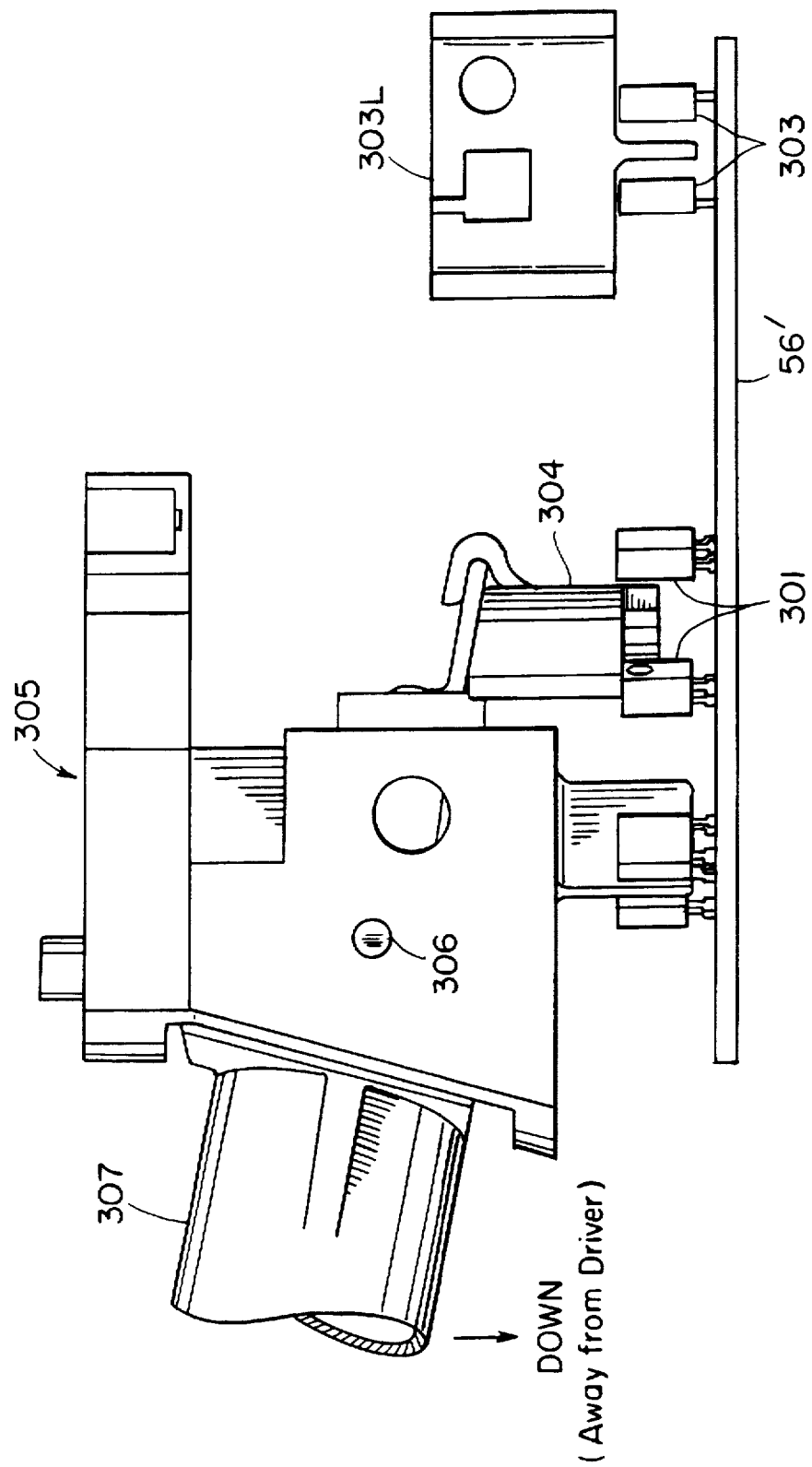
FIGS. 20–22 are views of the embodiment of FIG. 19 looking towards the hazard flasher.

Referring to FIG. 20, there is shown a view of the embodiment of FIG. 19 looking toward the end of hazard lever 303L with lever 307 in the center position. Clearance optical switch 304 is shadowed by high/low optical switch 301. Pushing lever 307 down away from the driver momentarily flashes the clearance lights on when the light control ring is in the off position for day signalling and momentarily flashes the clearance lights off when the light control ring is in any of the on positions for night signalling as shutter 304 rises to allow the photoelectric transducer in optical switch 302 to receive light from the associated light source. In the position shown in FIG. 19 and 20, the beam is blocked in the center and up positions of lever 307. In this position shutter 304 is constructed so that in the center and down positions, the optical beam in high/low optical switch 301 remains unobstructed.

Figure 21:
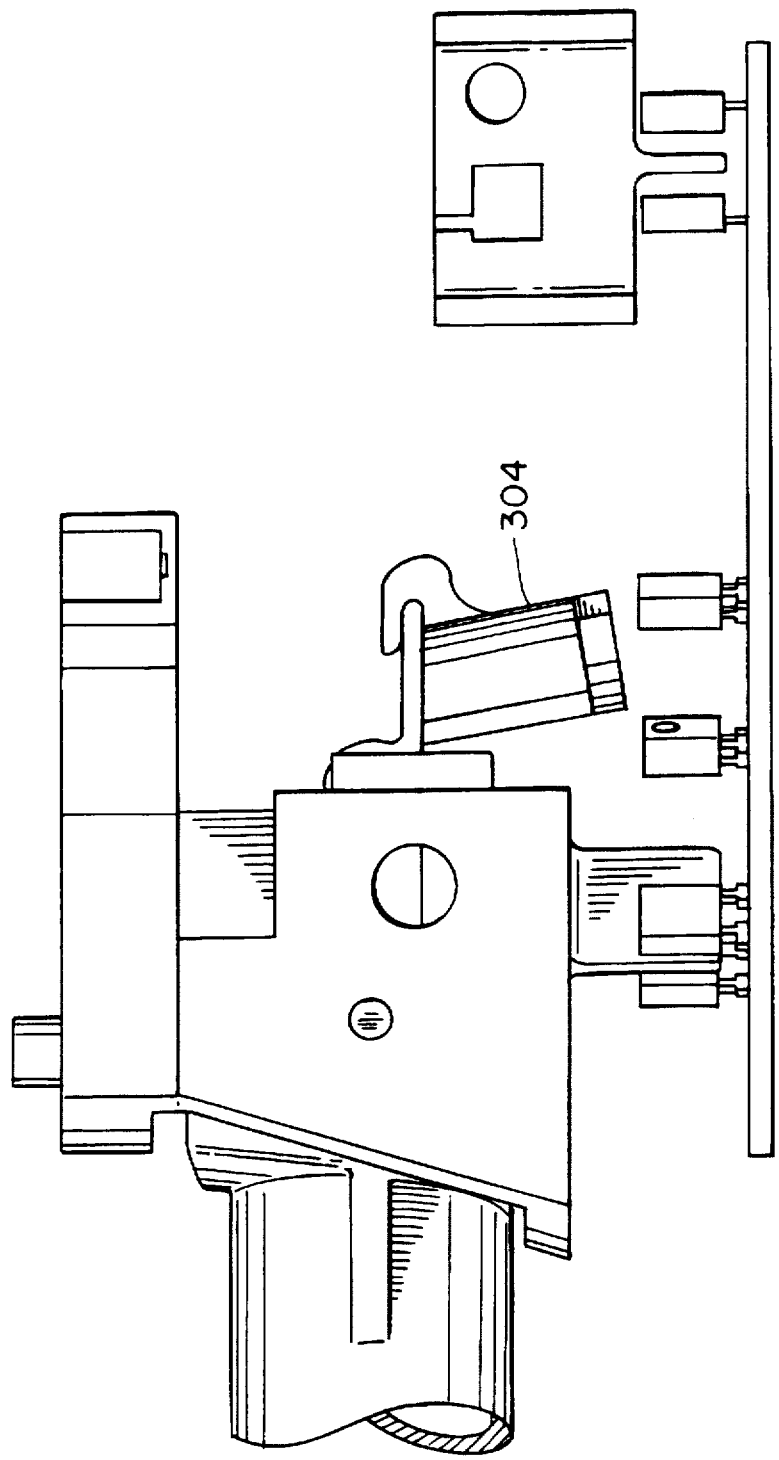

Referring to FIG. 21, there is shown the view of FIG. 20 with lever 307 in the down position and shutter 304 raised so that it avoids obstructing the light beams in both high/low beam optical switch 301 and clearance light optical switch 302.

Figure 22:
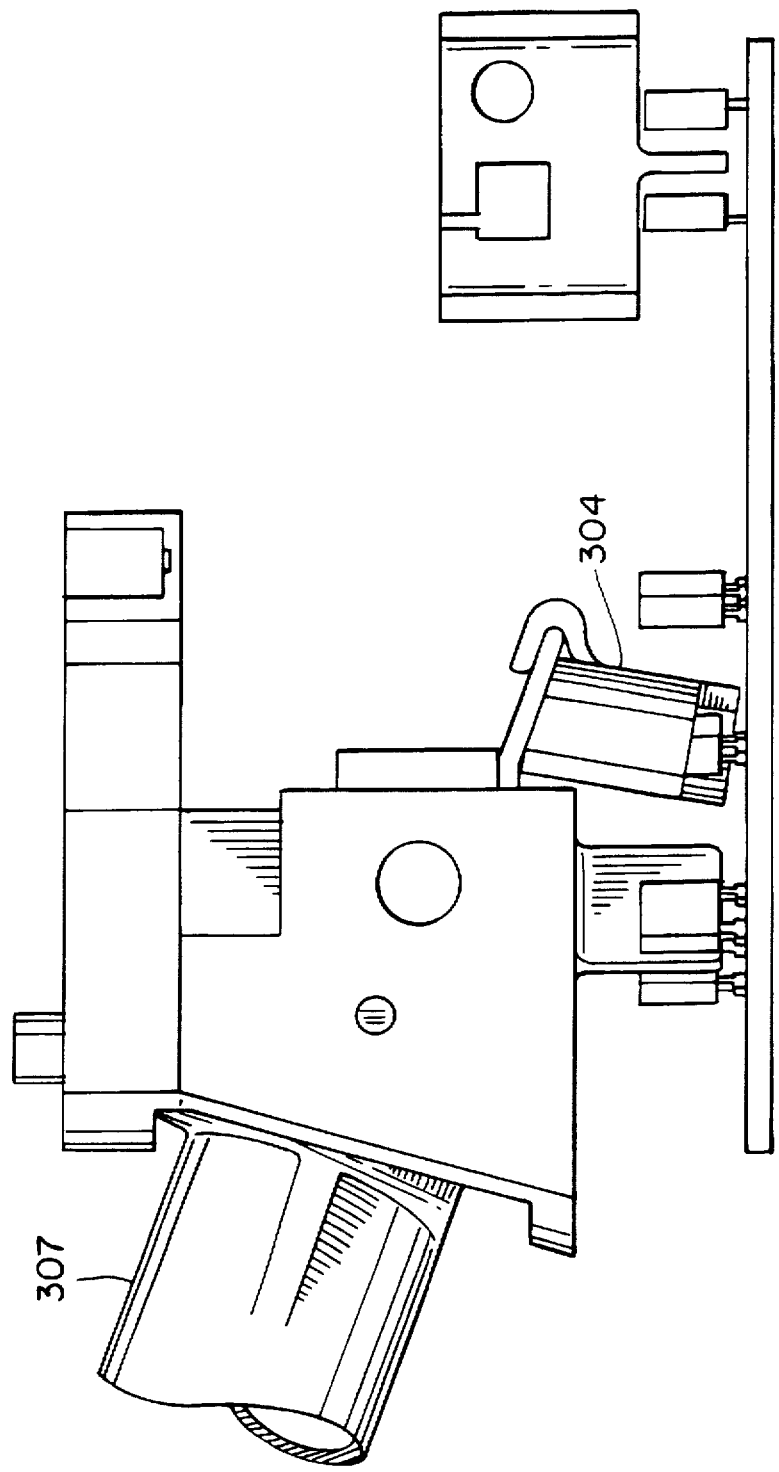

Referring to FIG. 22, there is shown the views of FIGS. 20 and 21 with lever 307 in the up position pulled toward the driver to interrupt the beam in high/low optical switch 301 and momentarily flash the high beams lights with the light control ring in either the off or park positions and alternately latch between low and high beam when the light control ring is in either of the off or park positions.

Figure 23:
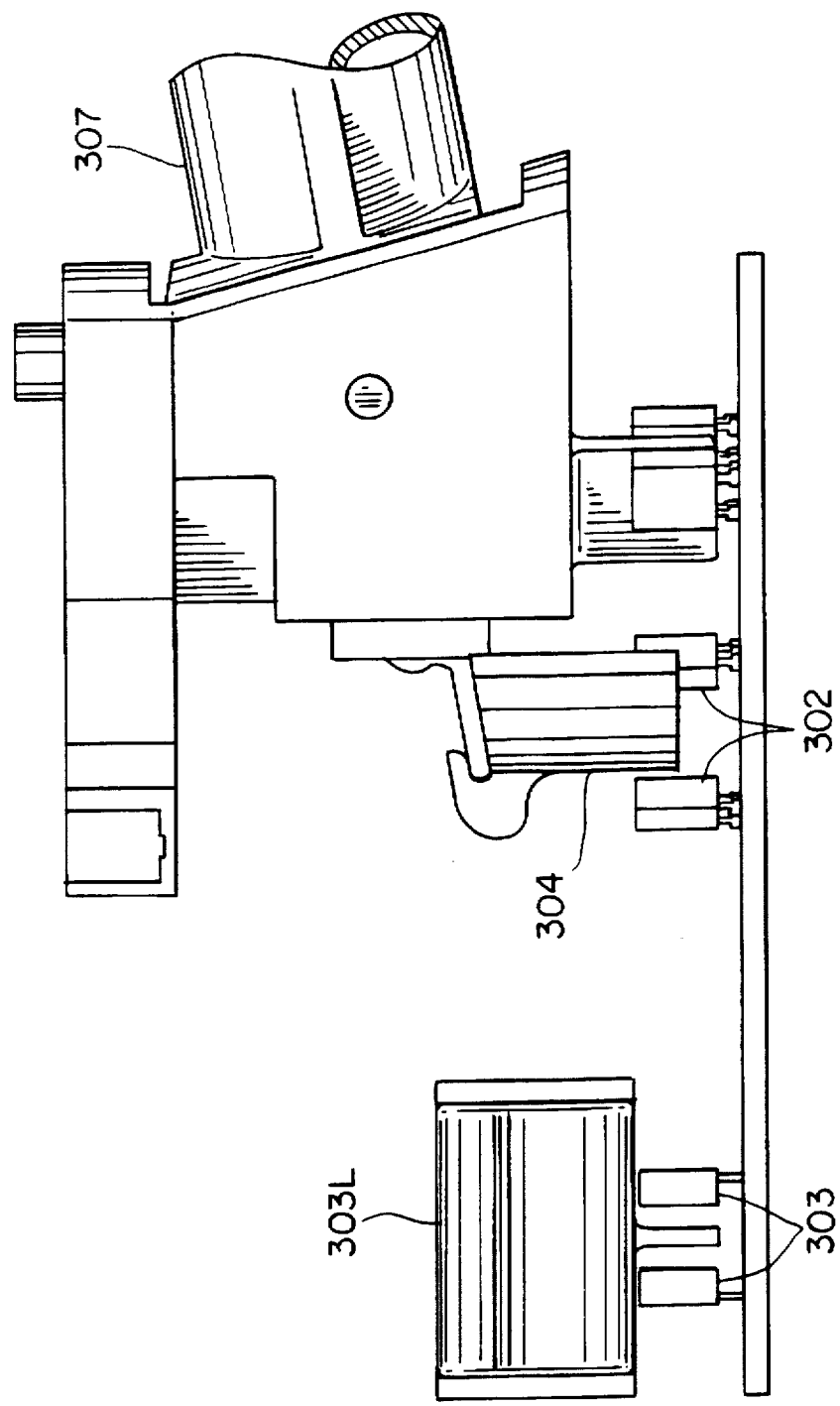
FIGS. 23–25 are views looking in a direction opposite to that in FIGS. 20–22.
Figure 24:
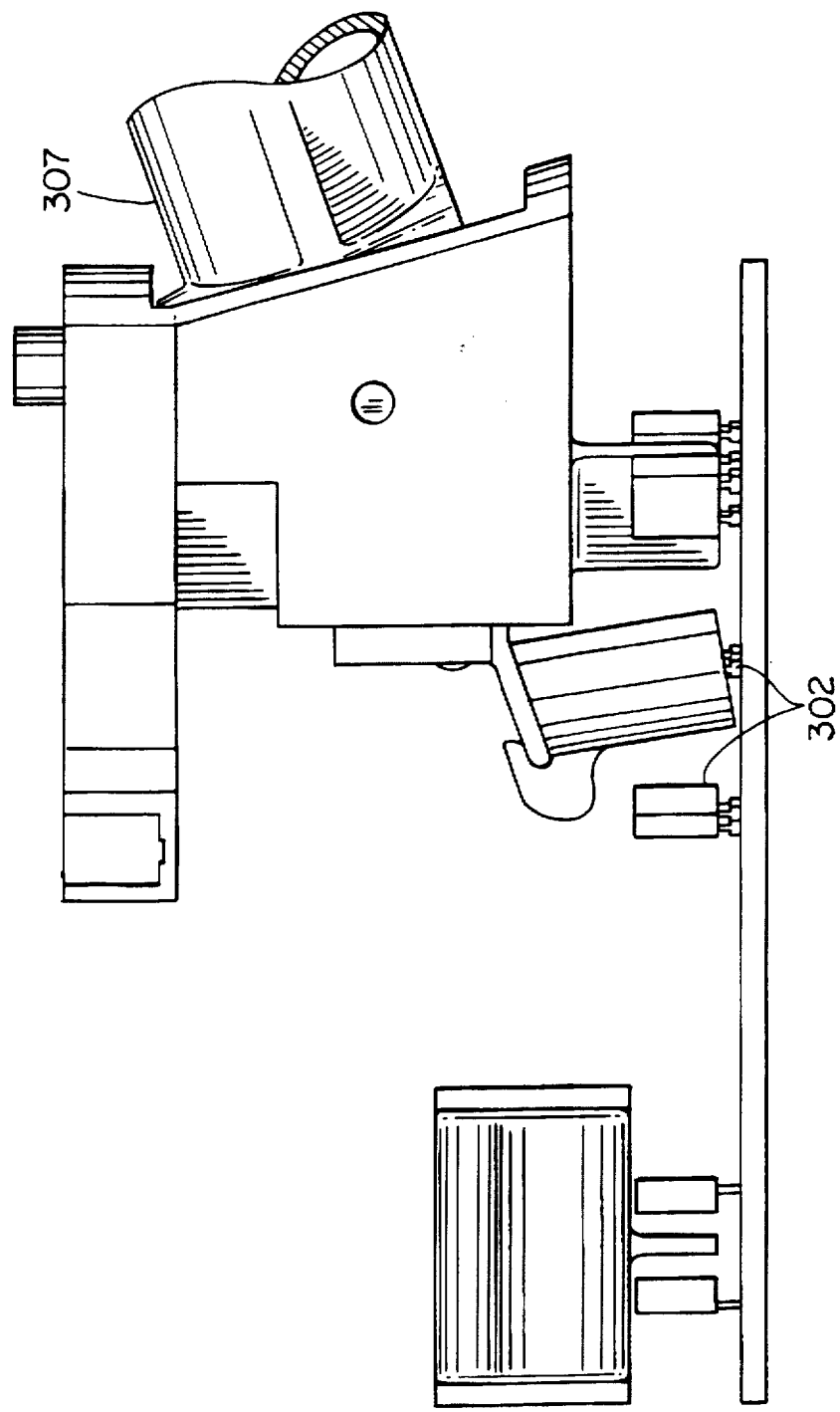
Figure 25:
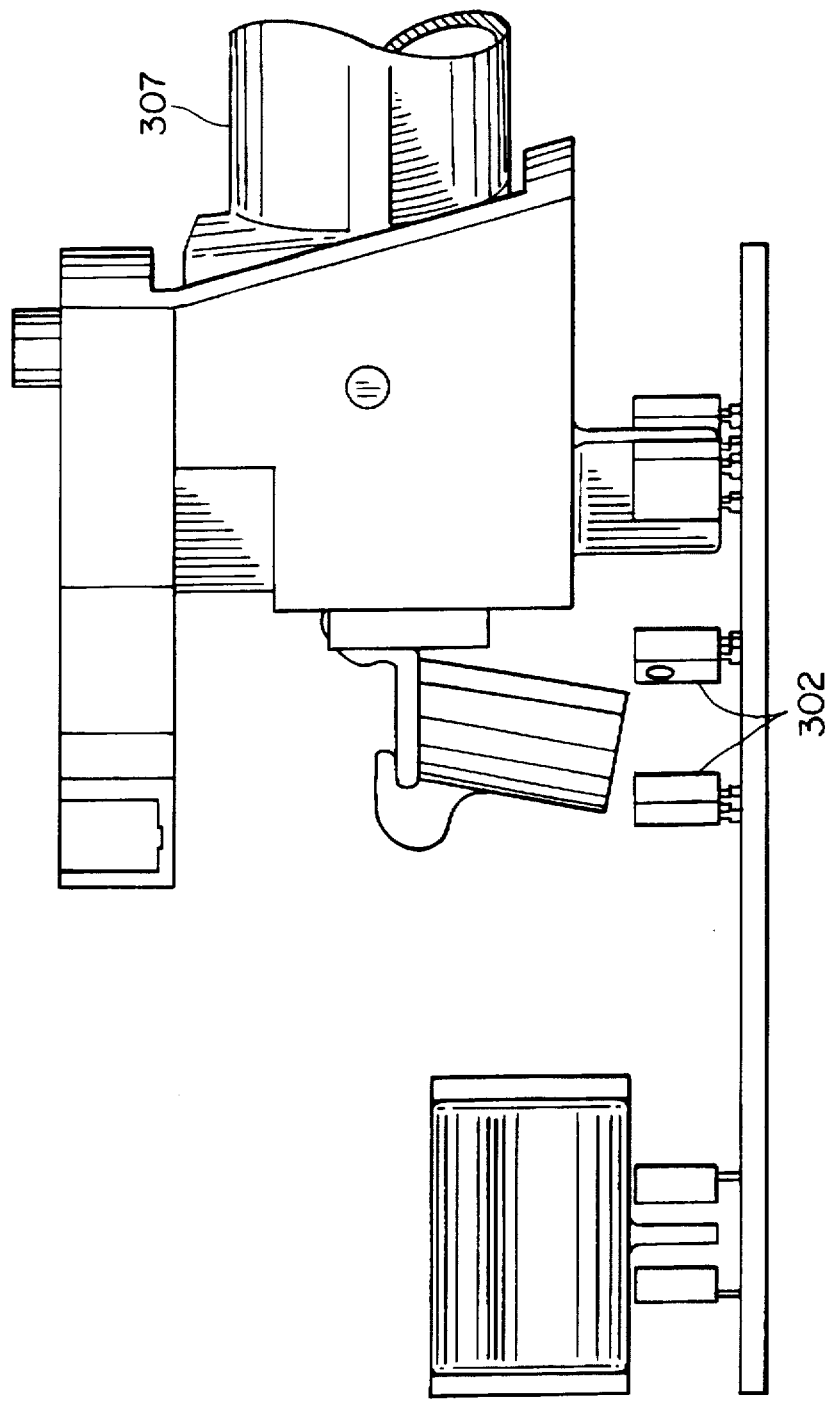

Referring to FIGS. 23, 24 and 25, there are shown views with lever 307 in the center, up and down positions, respectively, looking towards hazard switch 303L in the opposite direction so that clearance optical switch 302 is visible and shadows high/low optical switch 301.

Figure 26A:
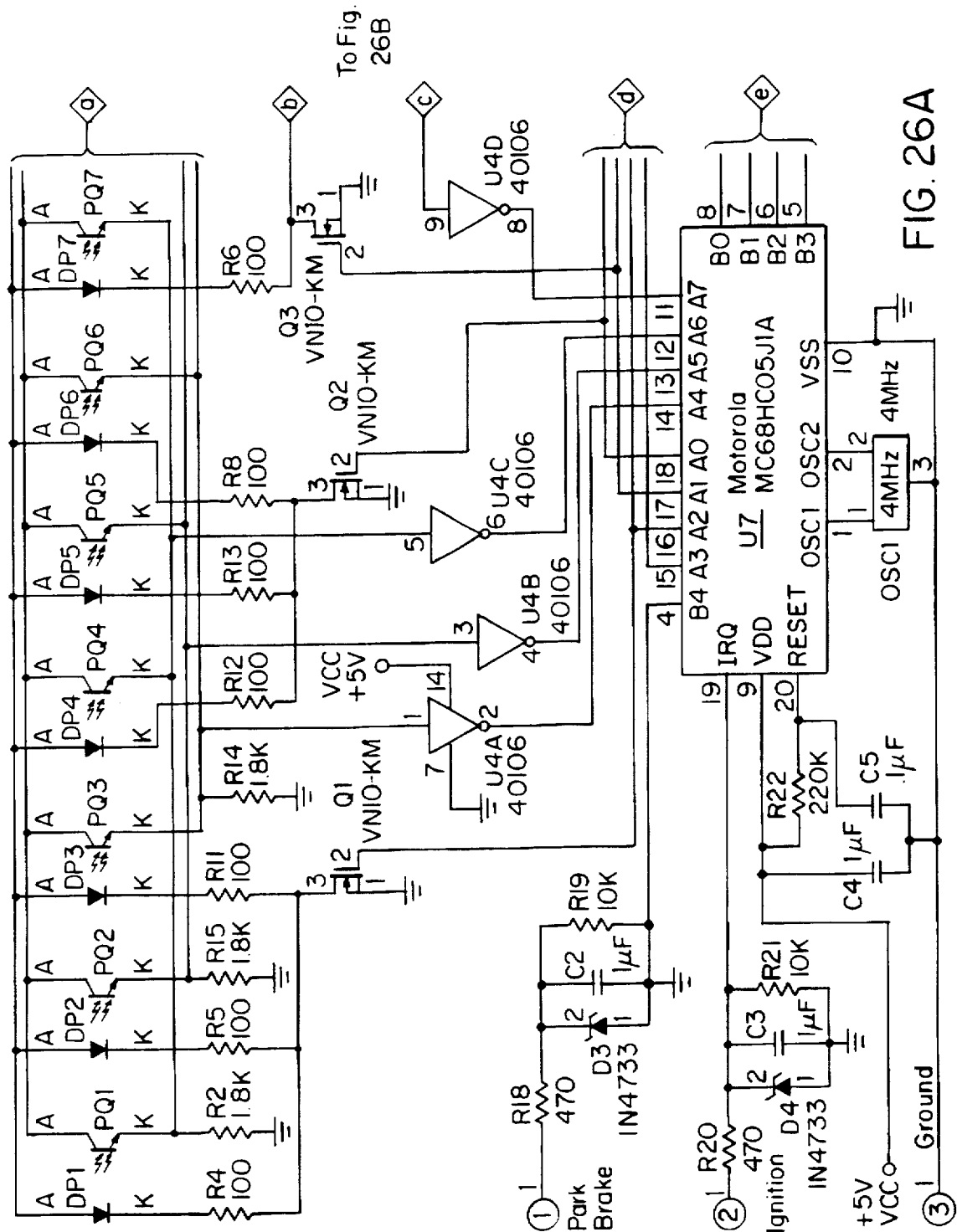
FIG. 26 is a schematic circuit diagram of a modification of the circuitry of FIG. 11 for use with the embodiment of FIGS. 19–25.

Referring to FIG. 26, there is shown a schematic circuit diagram with specific parameters values that represent a modification of the circuit of FIG. 11 for embodying the functions described above in connection with FIGS. 19–25. In FIG. 26, light emitting diode and photo transistor PQ10 correspond to clearance optical switch 302 and energize terminal A7 of microprocessor 140' through a fourth inverting amplifier 308. It is to be understood that the embodiment of FIG. 12 is modified to include clearance lights controlled by main lighting control module 168. Those skilled in the art will be able to practice the invention from the above description and drawing illustrations and program microprocessor U7 to respond to the states described above in connection with pushing the lever towards and away from the driver and establish the indicated flashing and latching responses.

Other embodiments are within the claims.

What is claimed is:

1. Apparatus for use with a vehicle, comprising:

A steering column control assembly having a control lever having a control lever axis and pivotally attached at one end and a first control knob rotatable supported about the control lever and the control lever axis, a plurality of optical switches coupled to said control lever and said first control knob configured to furnish a corresponding plurality of electrical output signals representative of respective positions of said control lever and said control knob; and mechanical controls comprising said control lever and said first control knob having selectable positions for controlling functions of the vehicle, the mechanical controls having shutters connected to the control lever and first control knob and constructed and arranged to control the electrical output signals of the optical switches based on the positions of the control lever and first control knob.

2. The apparatus of claim 1 wherein the optical switches comprise optical transmitters and optical receivers.

3. The apparatus of claim 1 further comprising, a controller connected to receive the electrical output signals of the optical switches and control the functions.

4. The apparatus of claim 1, wherein said vehicle includes a lightbulb and the functions comprise illumination and extinguishing of said lightbulb, and wherein the control lever controls an intensity level of light radiated from the lightbulb.

5. The apparatus of claim 1, wherein said vehicle includes a windshield wiper and the functions comprise operation of said windshield wiper and wherein the first control knob controls a speed at which said windshield wiper operates.

6. Apparatus for use with a vehicle having lights, including clearance lights, comprising, a steering column control assembly having a control lever having a control lever axis and pivotally attached at one end and a first control knob rotatable supported about the control lever and the control lever axis, a plurality of optical switches coupled to said control lever and said first control knob configured to furnish associated electrical output signals representative of respective, positions of said control lever and said control knob, mechanical controls comprising said control lever and said first control knob having selectable positions for controlling functions of the vehicle, the mechanical controls having shutters connected to the control lever and first control knob and positioned to control the electrical output signals of the optical switches based on the position of the mechanical controls a control circuit connected to the optical switches to determine the position of the mechanical controls characterized by the electrical output signals of the optical switches and furnish an indication of the position of the mechanical controls, wherein the functions include controlling said lights flashing and said mechanical controls include said control lever constructed and arranged to be movable to first and second end positions towards and away from a central position and includes shutter structure for controlling said shutters, wherein said optical switches include a clearance optical switch that coacts with said shutter structure so that movement of said control lever to a selected one of said first and second end positions produces a position signal that causes said control circuit to flash said clearance lights.

7. Apparatus in accordance with claim 6 wherein said vehicle includes headlights and said optical switches include a headlight optical switch, said shutter structure, said control circuit and said control lever constructed and arranged so that movement of said control lever to the other of said first and second end positions produces headlight flashing when said headlights are off and latches between bright and dim when said headlights are on.

* * * * *